United States Patent
Park et al.

(10) Patent No.: US 10,330,981 B2
(45) Date of Patent: Jun. 25, 2019

(54) LIQUID CRYSTAL DISPLAY DEVICE

(71) Applicant: Samsung Display Co. Ltd., Yongin-si (KR)

(72) Inventors: Heungshik Park, Yongin-si (KR); Jihong Bae, Yongin-si (KR); Kichul Shin, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 677 days.

(21) Appl. No.: 14/887,110

(22) Filed: Oct. 19, 2015

(65) Prior Publication Data

US 2016/0131947 A1    May 12, 2016

(30) Foreign Application Priority Data

Nov. 11, 2014  (KR) .................... 10-2014-0156235
Feb. 25, 2015  (KR) .................... 10-2015-0026744

(51) Int. Cl.
*G02F 1/1337* (2006.01)

(52) U.S. Cl.
CPC ............... *G02F 1/133711* (2013.01); *G02F 2001/133726* (2013.01); *G02F 2001/133742* (2013.01);
(Continued)

(58) Field of Classification Search
CPC ........... G02F 1/133711; G02F 1/13378; G02F 2001/133726; G02F 2001/133742; G02F 2001/133773; C07D 211/46; C07D 211/58; C07D 211/94; C07D 401/14; C07D 405/14; C09K 19/3066; C09K 19/3458; C09K 19/3483; C09K 19/52; C09K 19/54; C09K 2019/0448;
(Continued)

(56) References Cited

U.S. PATENT DOCUMENTS

2010/0197186 A1    8/2010  Shin et al.
2010/0213423 A1    8/2010  Shiau et al.
(Continued)

FOREIGN PATENT DOCUMENTS

EP    2463355 A2    6/2012
JP    2003-215592 A    7/2003
(Continued)

*Primary Examiner* — Sophie Hon
(74) *Attorney, Agent, or Firm* — H.C. Park & Associates, PLC

(57) ABSTRACT

A liquid crystal display (LCD) device comprises a first substrate; a second substrate facing the first substrate; a liquid crystal layer disposed between the first substrate and the second substrate and comprising liquid crystal molecules; a first alignment layer disposed between the first substrate and the liquid crystal layer; and a second alignment layer disposed between the second substrate and the liquid crystal layer, wherein one of the first alignment layer and the second alignment layer comprises a photostable compound, or a photostable compound-derived functional group, or a photostable compound and a photostable compound-derived functional group, and the other does not comprise the photostable compound, or the photostable compound-derived functional group, or the photostable compound and the photostable compound-derived functional group.

20 Claims, 6 Drawing Sheets

(52) U.S. Cl.
CPC ............ *G02F 2001/133773* (2013.01); *Y10T 428/1005* (2015.01)

(58) Field of Classification Search
CPC .................. C09K 2019/122–2019/123; C09K 2019/3004; C09K 2019/301; C09K 2019/3016; C09K 2019/3025; C09K 2019/3027; C09K 2019/3071; C09K 2019/3077–2019/3078; C09K 2019/308; C09K 2019/3083; C09K 2019/3422; C09K 2019/3425; Y10T 428/1005
See application file for complete search history.

(56) References Cited

U.S. PATENT DOCUMENTS

| | | | | |
|---|---|---|---|---|
| 2012/0092603 A1* | 4/2012 | Mizusaki | ............... | C08F 20/20 |
| | | | | 349/129 |
| 2012/0194770 A1 | 8/2012 | Kim et al. | | |
| 2012/0314168 A1* | 12/2012 | Kang | ............... | G02F 1/133723 |
| | | | | 349/124 |
| 2013/0314655 A1* | 11/2013 | Archetti | ............ | C09K 19/3003 |
| | | | | 349/124 |
| 2013/0335687 A1* | 12/2013 | Shen | ................. | G02F 1/133753 |
| | | | | 349/126 |

FOREIGN PATENT DOCUMENTS

| | | | | |
|---|---|---|---|---|
| JP | 2006106603 A * | 4/2006 | ............ | G02B 1/06 |
| KR | 10-2010-0089164 A | 8/2010 | | |
| KR | 10-2012-0089080 A | 8/2012 | | |
| KR | 10-2013-0026359 A | 3/2013 | | |
| KR | 10-2014-0043962 A | 4/2014 | | |
| WO | WO-2013156053 A1 * | 10/2013 | ............ | C08F 220/30 |

* cited by examiner

LIQUID CRYSTAL DISPLAY DEVICE

CLAIM OF PRIORITY

This application makes reference to, incorporates into this specification the entire contents of, and claims all benefits accruing under 35 U.S.C. § 119 from applications for LIQUID CRYSTAL DISPLAY DEVICE earlier filed in the Korean Intellectual Property Office on Nov. 11, 2014 and there duly assigned Serial No. 10-2014-0156235, and on Feb. 25, 2015 and there duly assigned Serial No. 10-2015-0026744.

BACKGROUND OF THE INVENTION

Field of the Invention

The present invention relates to a liquid crystal display (LCD) device.

Description of the Related Art

A liquid crystal display (LCD) device is one of the most common types of flat panel displays currently in use. The LCD device includes two substrates having formed thereon field-generating electrodes, such as a pixel electrode, a common electrode, and the like, and a liquid crystal layer interposed between the two substrates. The LCD device displays an image by applying a voltage to the field-generating electrodes to generate an electric field on the liquid crystal layer, determining a direction in which liquid crystal molecules of the liquid crystal layer are aligned by using the electric field, and controlling polarization of incident light.

The LCD devices may be classified into a vertically aligned mode LCD device, which drive liquid crystals by using an electric field formed in a direction perpendicular to the substrates, and an in-plane switching mode LCD device, which drive liquid crystals by using a horizontal electric field formed in a direction parallel to the substrates.

The vertically aligned mode LCD device has superior contrast ratio compared to in-plane switching mode LCD device. In order to ensure a wide viewing angle and to increase an aperture ratio of the vertically aligned mode LCD device, a liquid crystal layer region corresponding to one pixel is divided into a plurality of domains, and liquid crystal molecules having different pretilt angles exist inside of each of the domains.

In recent years, demand for curved display devices has been increasing. During bending processing, the degree of bending of an upper substrate and the degree of bending of a lower substrate differ from each other such that, in one domain of liquid crystal layer region, pretilt angles of liquid crystal molecules in an upper portion of the domain differ from those of liquid crystal molecules in a lower portion of the domain. This misalignment may cause unstable textures and reduction in transmittance.

SUMMARY OF THE INVENTION

One or more exemplary embodiments include a liquid crystal display (LCD) device capable of reducing generation of texture caused by misalignment when applied to a curved panel.

Additional aspects will be set forth in part in the description which follows and, in part, will be apparent from the description, or may be learned by practice of the presented embodiments.

According to one or more exemplary embodiments, there is provided a liquid crystal display (LCD) device including: a first substrate; a second substrate facing the first substrate; a liquid crystal layer disposed between the first substrate and the second substrate and including liquid crystal molecules; a first alignment layer disposed between the first substrate and the liquid crystal layer; and a second alignment layer disposed between the second substrate and the liquid crystal layer, wherein one of the first alignment layer and the second alignment layer includes a photostable compound, or a photostable compound-derived functional group, or a photostable compound and a photostable compound-derived functional group, and the other does not include the photostable compound, or the photostable compound-derived functional group, the photostable compound and the photostable compound-derived functional group.

In an exemplary embodiment of the present invention, the first alignment layer may include a first material having a first main chain and a first side chain bound to the first main chain, and the second alignment layer may include a second material having a second main chain and a second side chain bound to the second main chain. Furthermore, one of the first side chain and the second side chain may include a photostable compound-derived functional group, and the other may not include the photostable compound-derived functional group.

In an exemplary embodiment of the present invention, the first substrate and the second substrate may be bent to have almost same radius of curvature, and the second substrate may be located inside of the radius of the curvature.

In an exemplary embodiment of the present invention, the first substrate and the second substrates may be bent to have almost same radius of curvature, and the second substrate may be located inside of the radius of the curvature. The second side chain may include the photostable compound-derived functional group, and the first side chain may not comprise the photostable compound-derived functional group.

In an exemplary embodiment of the present invention, the first substrate and the second substrate may be bent to have almost same radius of curvature, and the second substrate may be located inside of the radius of the curvature. The second side chain may include the photostable compound-derived functional group, and the first side chain may not include the photostable compound-derived functional group, wherein the photostable compound-derived functional group included in the second side chain may be disposed between the second alignment layer and the liquid crystal layer.

In an exemplary embodiment of the present invention, an angle between a major axis of the liquid crystal molecules in contact with the first alignment layer and a surface of the first substrate may be different from an angle between a major axis of the liquid crystal molecules in contact with the second alignment layer and a surface of the second substrate.

In an exemplary embodiment of the present invention, an angle between a major axis of the liquid crystal molecules in contact with the second alignment layer and a surface of the second substrate may be greater than an angle between a major axis of the liquid crystal molecules in contact with the first alignment layer and a surface of the first substrate.

In an exemplary embodiment of the present invention, the photostable compound-derived functional group may be located at an interface between the first alignment layer and the liquid crystal layer or at an interface between the second alignment layer and the liquid crystal layer.

In an exemplary embodiment of the present invention, the photostable compound may include at least one compound selected from the group consisting of a first compound represented by Formula 1, a second compound represented by Formula 2, a third compound represented by Formula 3, a fourth compound represented by Formula 4, and a fifth compound represented by Formula 5.

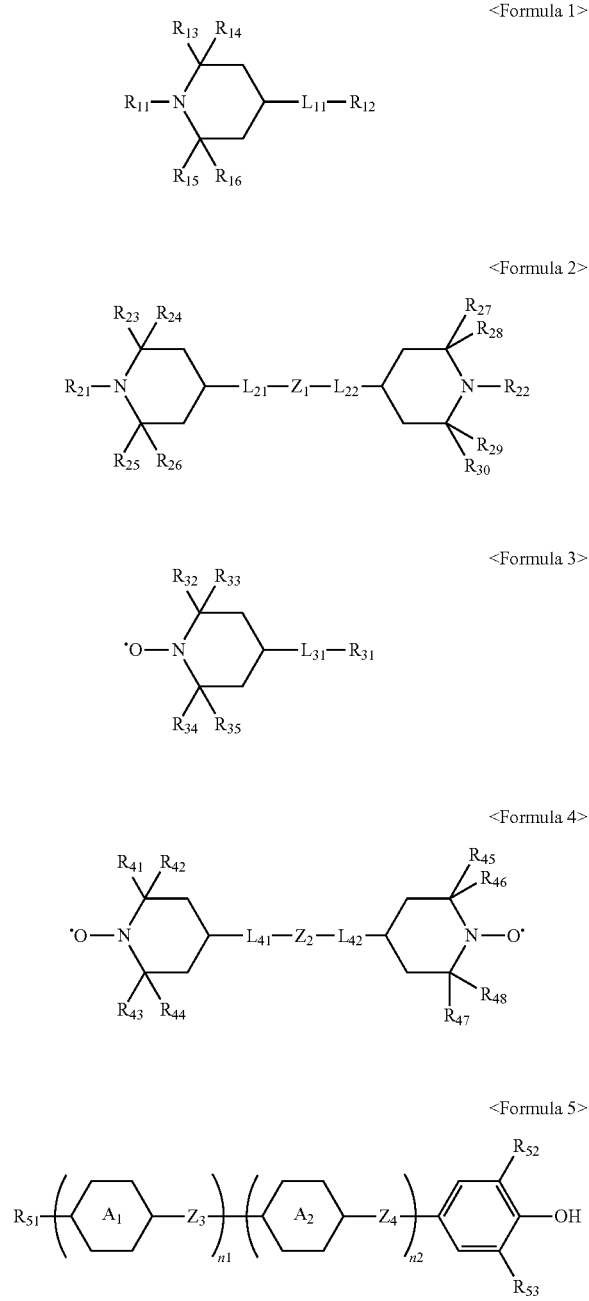

<Formula 1>
<Formula 2>
<Formula 3>
<Formula 4>
<Formula 5>

In Formulae 1 to 5, $A_1$ and $A_2$ may be each independently selected from a substituted or unsubstituted cyclohexane ring and a substituted or unsubstituted benzene ring, $Z_1$ to $Z_4$ may be each independently selected from the group consisting of a single bond, a substituted or unsubstituted $C_1$-$C_{20}$ alkylene group, a substituted or unsubstituted $C_2$-$C_{20}$ alkenylene group, a substituted or unsubstituted $C_3$-$C_{10}$ cycloalkylene group, a substituted or unsubstituted $C_1$-$C_{10}$ heterocycloalkylene group, a substituted or unsubstituted $C_3$-$C_{10}$ cycloalkenylene group, a substituted or unsubstituted $C_1$-$C_{10}$ heterocycloalkenylene group, a substituted or unsubstituted $C_6$-$C_{60}$ arylene group, a substituted or unsubstituted $C_1$-$C_{60}$ heteroarylene group, *—(C=O)—O—*', and *—C($R_1$)—O—*', $L_{11}$, $L_{21}$, $L_{22}$, $L_{31}$, $L_{41}$, and $L_{42}$ may be each independently selected from the group consisting of *—O—*', *—(C=O)—O—*', *—O—(C=O)—*', *—O—(C=O)—O—*', and *—N($R_2$)—*', $R_1$, $R_2$, $R_{11}$ to $R_{16}$, $R_{21}$ to $R_{30}$, $R_{31}$ to $R_{35}$, $R_{41}$ to $R_{48}$, and $R_{51}$ to $R_{53}$ may be each independently selected from the group consisting of a hydrogen, —F, —Cl, —Br, —I, a substituted or unsubstituted $C_1$-$C_{20}$ alkyl group, a substituted or unsubstituted $C_1$-$C_{20}$ alkoxy group, a substituted or unsubstituted $C_3$-$C_{10}$ cycloalkyl group, and a substituted or unsubstituted $C_1$-$C_{10}$ heterocycloalkyl group; and n1 and n2 may be each independently 0 or 1, at least one substituent of the substituted cyclohexane ring, the substituted benzene ring, the substituted $C_1$-$C_{20}$ alkylene group, the substituted $C_2$-$C_{20}$ alkenylene group, the substituted $C_3$-$C_{10}$ cycloalkylene group, the substituted $C_1$-$C_{10}$ heterocycloalkylene group, the substituted $C_3$-$C_{10}$ cycloalkenylene group, the substituted $C_1$-$C_{10}$ heterocycloalkenylene group, the substituted $C_6$-$C_{60}$ arylene group, the substituted $C_1$-$C_{60}$ heteroarylene group, the substituted $C_1$-$C_{20}$ alkyl group, the substituted $C_1$-$C_{20}$ alkoxy group, the substituted $C_3$-$C_{10}$ cycloalkyl group, and the substituted $C_1$-$C_{10}$ heterocycloalkyl group may be selected from the group consisting of: —F, —Cl, —Br, —I, an amino group, a cyano group, a $C_1$-$C_5$ alkyl group, and a $C_1$-$C_5$ alkoxy group; and a $C_1$-$C_5$ alkyl group and a $C_1$-$C_5$ alkoxy group, each substituted with at least one of —F, —Cl, —Br, —I, a cyano group, an amino group, a $C_1$-$C_5$ alkyl group, and a $C_1$-$C_5$ alkoxy group, O. or .O may be an oxygen radical, and * and *' may each denote a binding site to a neighboring atom.

In an exemplary embodiment of the present invention, in Formulae 1 to 5, $A_1$ and $A_2$ may be each independently selected from the group consisting of: a benzene and a cyclohexane; and a benzene and a cyclohexane, each substituted with at least one of —F, —$CF_3$, and a $C_1$-$C_5$ alkyl group, $Z_1$ to $Z_4$ may be each independently selected from the group consisting of: a single bond, a $C_1$-$C_{10}$ alkylene group, a $C_3$-$C_{10}$ cycloalkylene group, a $C_1$-$C_{10}$ heterocycloalkylene group, and a $C_1$-$C_{10}$ heteroarylene group; and a $C_1$-$C_{10}$ alkylene group, a $C_3$-$C_{10}$ cycloalkylene group, a $C_1$-$C_{10}$ heterocycloalkylene group, a $C_1$-$C_{10}$ heteroarylene group, *—(C=O)—O—*', and *—C($R_1$)—O—*', each substituted with at least one of —F, —Cl, —Br, —I, a cyano group, an amino group, a $C_1$-$C_5$ alkyl group, and a $C_1$-$C_5$ alkoxy group, $L_{11}$, $L_{21}$, $L_{22}$, $L_{31}$, $L_{41}$, and $L_{42}$ may be each independently selected from the group consisting of *—(C=O)—O—*', *—O—(C=O)—*', and *—N($R_2$)—*', and $R_1$, $R_2$, $R_{11}$ to $R_{16}$, $R_{21}$ to $R_{30}$, $R_{31}$ to $R_{35}$, $R_{41}$ to $R_{48}$, and $R_{51}$ to $R_{53}$ may be each independently selected from the group consisting of: a hydrogen, a $C_1$-$C_{10}$ alkyl group, a $C_3$-$C_{10}$ cycloalkyl group, and a $C_1$-$C_{10}$ alkoxy group; and a $C_1$-$C_{10}$ alkyl group, a $C_3$-$C_{10}$ cycloalkyl group, and a $C_1$-$C_{10}$ alkoxy group, each substituted with at least one of —F, —Cl, —Br, —I, a cyano group, a $C_1$-$C_5$ alkyl group, a $C_3$-$C_{10}$ cycloalkyl group, and a $C_1$-$C_5$ alkoxy group.

In an exemplary embodiment of the present invention, the first compound may be represented by Formula 1-1, the second compound may be represented by one of Formulae 2-1 and 2-2, the third compound may be represented by Formula 3-1, the fourth compound may be represented by Formula 4-1, and the fifth compound may be represented by one of Formulae 5-1 and 5-2:

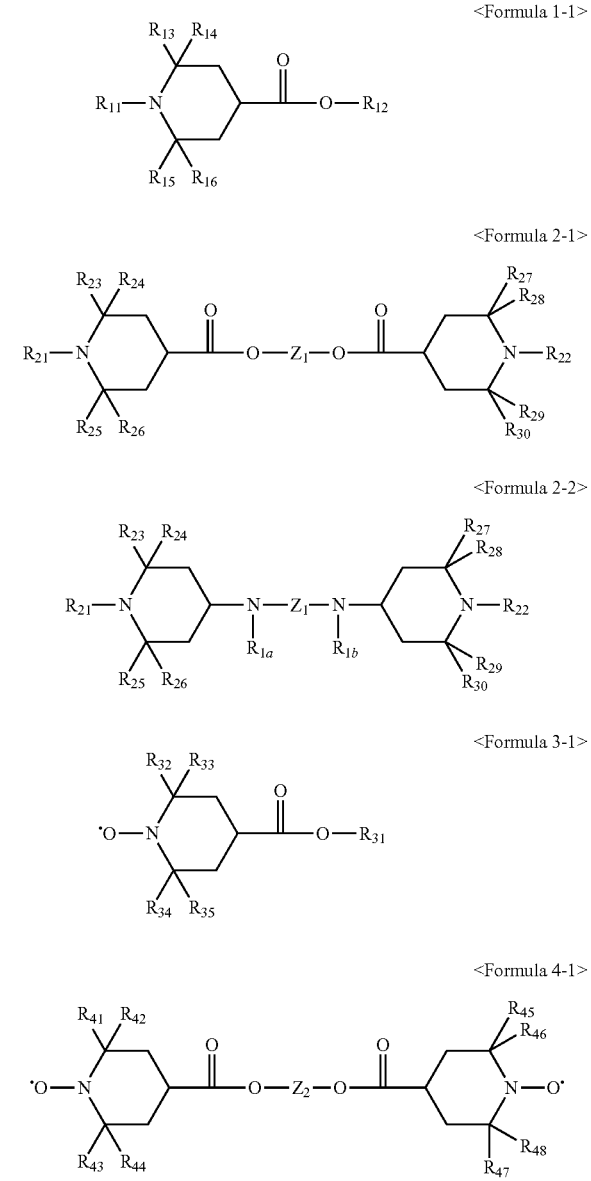

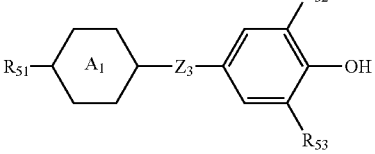

In the Formulae 1-1, 2-1, 2-2, 3-1, 4-1, 5-1, and 5-2 above, descriptions of $A_1$, $Z_1$ to $Z_3$, O. and .O, $R_{11}$ to $R_{16}$, $R_{21}$ to $R_{30}$, $R_{31}$ to $R_{35}$, $R_{41}$ to $R_{48}$, and $R_{51}$ to $R_{53}$ may be referred to the descriptions provided in the above specification, and descriptions of $R_{1a}$ and $R_{1b}$ may be referred to the descriptions in connection with $R_1$ in the above specification.

In an exemplary embodiment of the present invention, the first main chain and the second main chain may be each independently at least one selected from the group consisting of polysiloxane, polyamic acid, polyimide, nylon, polyvinyl alcohol, and polyvinyl chloride.

In an exemplary embodiment of the present invention, the first side chain and the second side chain may each independently include at least one selected from the group consisting of a vertically aligned functional group, an electron transporting moiety, and a photoinitiator.

In an exemplary embodiment of the present invention, the vertically aligned functional group may be present at an interface between the first alignment layer and the liquid crystal layer and between the second alignment layer and the liquid crystal layer.

In an exemplary embodiment of the present invention, the liquid crystal molecule may have a negative (−) dielectric anisotropy (Δ∈).

In an exemplary embodiment of the present invention, the liquid crystal molecule may include at least one selected from the group consisting of an alkenyl-based liquid crystal molecule, an alkoxy-based liquid crystal molecule, and a terphenyl-based liquid crystal molecule.

In an exemplary embodiment of the present invention, the liquid crystal layer may further include a reactive mesogen polymer including a repeating unit represented by Formula 60:

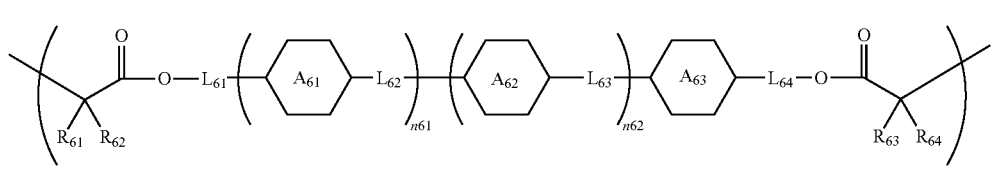

In Formula 60, a ring $A_{61}$, a ring $A_{62}$, and a ring $A_{63}$ may be each independently selected from the group consisting of a substituted or unsubstituted benzene ring and a substituted or unsubstituted naphthalene ring, $L_{61}$ to $L_{64}$ may be each independently selected from the group consisting of a single bond, *—CH$_2$CH$_2$CH$_2$—*', *—CH$_2$CH$_2$O—*', *—OCH$_2$CH$_2$—*', *—CF$_2$O—*', *—OCF$_2$—*', *—(C=O)—O—*', and *—O—(C=O)—*', n61 and n62 may be each independently 0 or 1, $R_{61}$ to $R_{64}$ may be each independently selected from the group consisting of a hydrogen, —F, —Cl, —Br, —I, a cyano group, a substituted or unsubstituted $C_1$-$C_{10}$ alkyl group, and a substituted or unsubstituted $C_1$-$C_{10}$ alkoxy group, at least one substituent of the substituted benzene ring, the substituted naphthalene ring, the substituted $C_1$-$C_{20}$ alkyl group, and the substituted $C_1$-$C_{20}$ alkoxy group may be selected from the group consisting of —F, —Cl, —Br, —I, a cyano group, a $C_1$-$C_5$ alkyl group, and a $C_1$-$C_5$ alkoxy group, and * and *' may be each a binding site to a neighboring atom.

In an exemplary embodiment of the present invention, the ring $A_{61}$, the ring $A_{62}$, and the ring $A_{63}$ may be each independently selected from Formulae represented by Formulae 61-1 and 61-2:

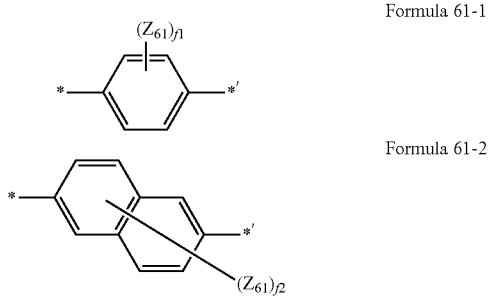

Formula 61-1

Formula 61-2

In Formulae 61-1 and 61-2, $Z_{61}$ may be selected from the group consisting of a hydrogen, —F, —Cl, —Br, —I, a cyano group, a $C_1$-$C_5$ alkyl group, and a $C_1$-$C_5$ alkoxy group, f1 may be an integer selected from 1 to 3 and f2 is an integer selected from 1 to 5, and * and *' may be each a binding site to a neighboring atom.

In an exemplary embodiment of the present invention, in Formula 60, $L_{61}$ to $L_{64}$ may be each independently selected from the group consisting of a single bond, *—CH$_2$CH$_2$CH$_2$—*', *—CH$_2$CH$_2$O—*', *—OCH$_2$CH$_2$—*', *—(C=O)—O—*', and *—O—(C=O)—*', and $R_{61}$ to $R_{64}$ are each independently selected from: a hydrogen and a $C_1$-$C_{10}$ alkyl group; and a $C_1$-$C_{10}$ alkyl group substituted with at least one of —F, —Cl, —Br, —I, a cyano group, a $C_1$-$C_5$ alkyl group, and a $C_1$-$C_5$ alkoxy group.

In an exemplary embodiment of the present invention, the liquid crystal display device may be a vertically aligned mode liquid crystal display device.

BRIEF DESCRIPTION OF THE DRAWINGS

A more complete appreciation of the present invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
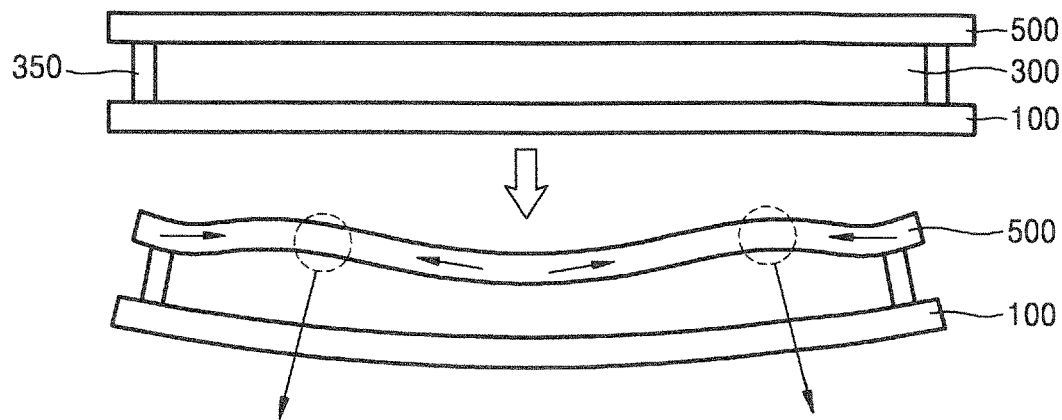
FIG. 1 is a conceptual diagram showing that degree of bending of a first substrate 100 and degree of bending of a second substrate 500 are different from each other in bending processing for forming a curved panel according to an exemplary embodiment of the present invention.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

It will be understood that although the terms "first", "second", etc. may be used herein to describe various components, these components should not be limited by these terms. These components are only used to distinguish one component from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

Sizes of elements in the drawings may be exaggerated for convenience of explanation. In other words, since sizes and thicknesses of components in the drawings are arbitrarily illustrated for convenience of explanation, the following embodiments are not limited thereto.

FIG. 1 is a conceptual view showing that degree of bending of a first substrate 100 and degree of bending of a second substrate 500 are different from each other in bending processing for forming a curved panel according to an exemplary embodiment of the present invention.

Referring to FIG. 1, since edges of a panel are fixed using a sealant 350, buckling occurs at portions marked by dashed lines, and the degree of misalignment between the first substrate 100 and the second substrate 500 increases outward from the center of the panel. Accordingly, a miss-aligned texture is generated, and transmittance may decrease in the miss-aligned texture.

Figure 2A:
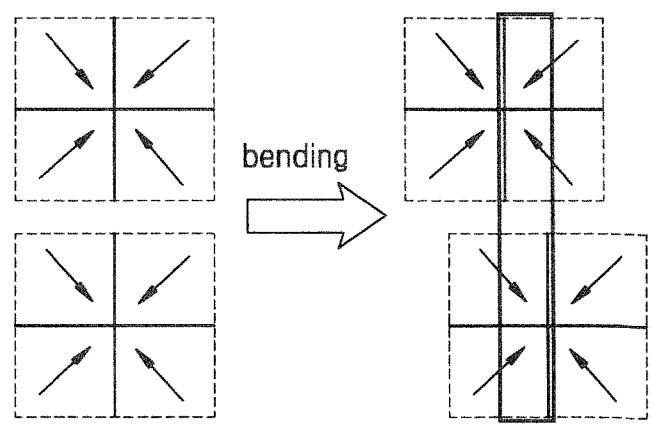
FIG. 2A is a conceptual diagram of a domain misalignment caused by buckling of substrates when same pretilt angle is applied to the first substrate 100 and the second substrate 500.
Figure 2B:
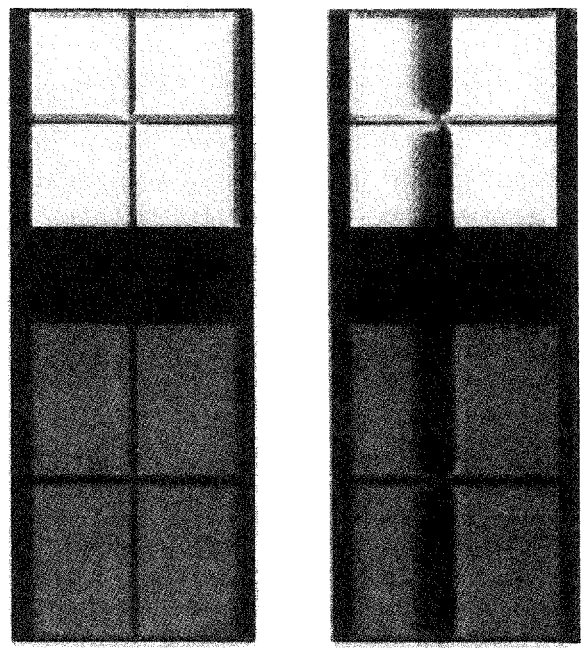
FIG. 2B is a diagram illustrating a display of a liquid crystal display (LCD) device having the domain misalignment caused by buckling of substrates according to an exemplary embodiment of the present invention.

FIG. 2A is a conceptual diagram of a domain misalignment caused by buckling of substrates when same pretilt angle is applied to the first substrate 100 and the second substrate 500, and FIG. 2B is a diagram illustrating a display of a liquid crystal display (LCD) device having the domain misalignment caused by buckling of substrates according to an exemplary embodiment of the present invention.

Figure 3A:
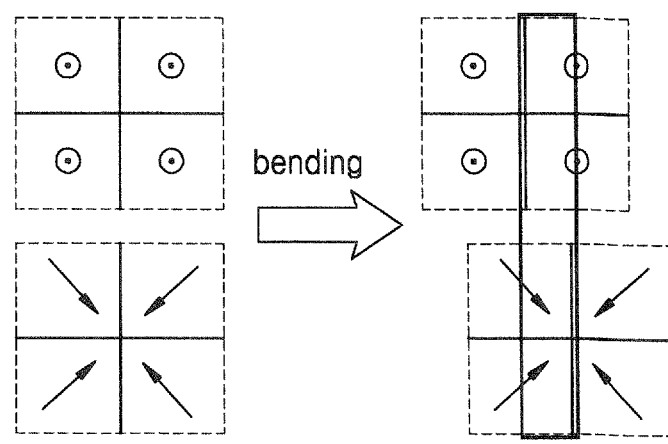
FIG. 3A is a conceptual diagram showing a decrease in a domain misalignment caused by buckling of substrates when a pretilt angle is applied to the first substrate only.
Figure 3B:
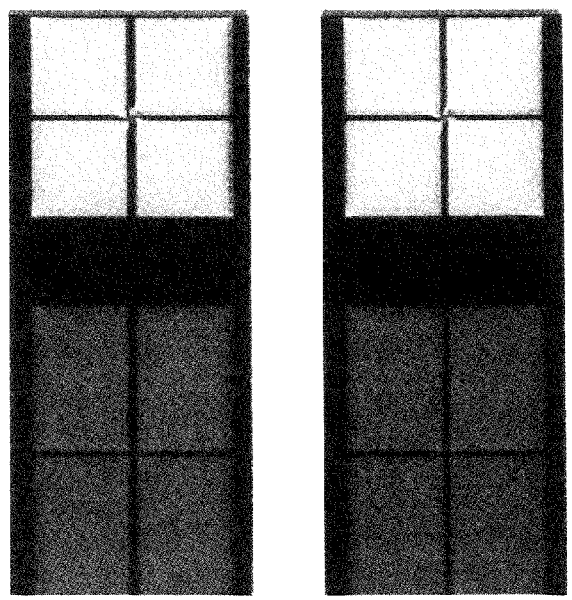
FIG. 3B is a diagram illustrating a display of an LCD device having the decreased domain misalignment caused by buckling of substrates according to an exemplary embodiment of the present invention.

FIG. 3A is a conceptual diagram showing a decrease in a domain misalignment caused by buckling of substrates when a pretilt angle is applied to the first substrate 100 only, and FIG. 3B is a diagram illustrating a display of an LCD device having the decreased domain misalignment caused by buckling of substrates according to an exemplary embodiment.

In FIGS. 2A and 3A, arrows indicate major axes of liquid crystal molecules. Upper and lower diagrams on the left of FIGS. 2A and 3A are plan views illustrating directions of liquid crystal molecules before bending process at a region where buckling occurs as illustrated in FIG. 1. Upper and lower diagrams on the right of FIGS. 2A and 2B are plan views illustrating directions of liquid crystal molecules after the bending process at a region where the buckling occurs as illustrated in FIG. 1. A rectangle marked by bold solid lines indicates regions facing each other. As illustrated in FIG. 2A, pretilt angles are misaligned at the region facing each other by the bending process. Accordingly, as illustrated in FIG. 2B, a misaligned texture is caused and transmittance decreases. However, as illustrated in FIG. 3A, when a pretilt angle is applied to the first substrate 100 only according to an exemplary embodiment of the present invention, misalignment caused by buckling does not occur. Accordingly, as illustrated in FIG. 3B, generation of texture or a decrease in transmittance less likely occurs.

Figure 4:
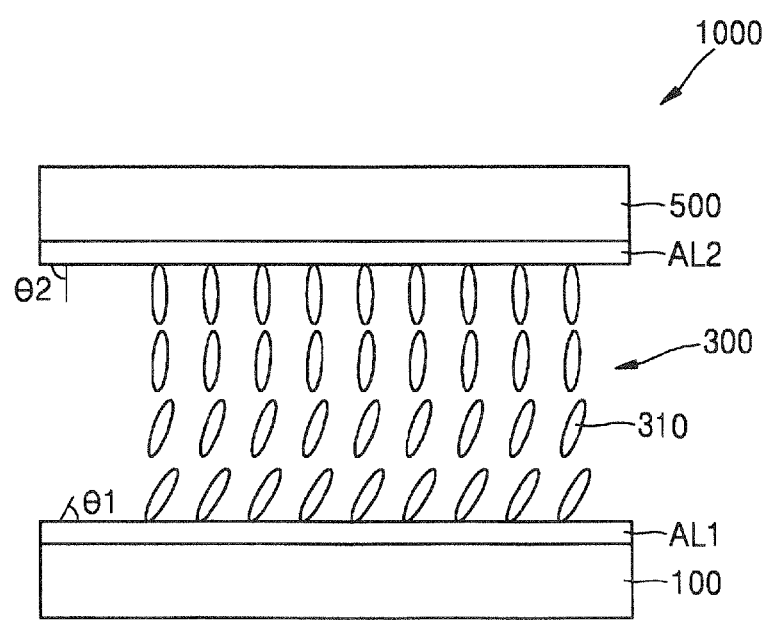
FIG. 4 is a schematic cross-sectional view of a LCD device 1000 according to an exemplary embodiment of the present invention.

FIG. 4 is a schematic cross-sectional view of a LCD device 1000 according to an exemplary embodiment of the present invention. Hereinafter, a structure of a LCD and a method of manufacturing the same will be described with reference to FIG. 4.

The LCD device 1000 includes a first substrate 100, a second substrate 500 facing the first substrate 100, a liquid crystal layer 300 disposed between the first substrate 100 and the second substrate 500. The liquid crystal layer may include liquid crystal molecules 310.

The first substrate 100 and the second substrate 500 may be each a glass substrate or a plastic substrate including polyethylene terephthalate (PET), polyethylene naphthalate (PEN), polyimide, or the like.

According to an exemplary embodiment of the present invention, the first substrate 100 and the second substrate 500 may be bent to have almost same radius of curvature, and the second substrate 500 may be located inside of the radius of the curvature. For example, an outer surface of the second substrate 500 may be a display surface (DS) of the second substrate 500.

A first alignment layer AL1 is formed between the first substrate 100 and the liquid crystal layer 300, and a second alignment layer AL2 is formed between the second substrate 500 and the liquid crystal layer 300. The first alignment layer AL1 or the second alignment layer AL2 is prepared, so as to form a predetermined pretilt angle in the liquid crystal molecules 310. That is, a major axis of the liquid crystal molecules 310 in contact with the first alignment layer AL1 or the second alignment layer AL2 is not disposed at right angles with surface of the first alignment layer AL1 or the second alignment layer AL2 or with surface of the first substrate 100 or the second substrate 500. An angle θ1 with the surface of the first alignment layer AL1 or with the first substrate 100, or an angle θ2 with the surface of the second alignment layer AL2 or with the surface of the second substrate 500, is less than 90°. The angle θ1 or θ2 may be greater than 85° and less than 89.5°.

One of the first alignment layer AL1 and the second alignment layer AL2 may include a photostable compound or a photostable compound-derived functional group, or the photostable compound and the photostable compound-derived functional group, and the other may not include the photostable compound and the photostable compound-derived functional group.

According to an exemplary embodiment of the present invention, the first alignment layer AL1 may include a first material including a first main chain and a first side chain bound to the first main chain, and the second alignment layer AL2 may include a second material having a second main chain and a second side chain bound to the second main chain. For example, the first material may include a first main chain and a plurality of first side chains bound to the first main chain, wherein the plurality of first side chains may include functional groups or moieties that are identical to or different from each other. In addition, the second material may include a second main chain and a plurality of second side chains bound to the second main chain, wherein the plurality of the second side chains may include functional groups or moieties that are identical to or different from each other.

According to an exemplary embodiment of the present invention, the first main chain and the second main chain may each independently include at least one of polysiloxane, poly(amic acid), polyimide, nylon, polyvinyl alcohol, and polyvinyl chloride.

One of the first side chain and the second side chain may include a photostable compound-derived functional group, and the other may not include the photostable compound-derived functional group. That is, the photo stable compound-derived functional group may be included in only one of the first side chain and the second side chain. The photostable compound may be at least one selected from the group consisting of a first compound represented by Formula 1, a second compound represented by Formula 2, a third compound represented by Formula 3, a fourth compound represented by Formula 4, and a fifth compound represented by Formula 5:

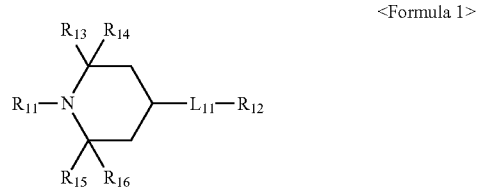

<Formula 1>

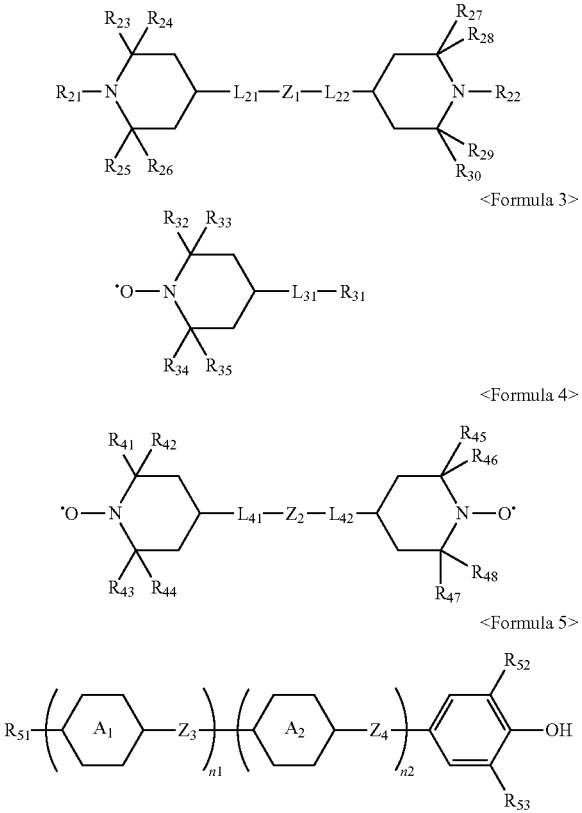

<Formula 2>
<Formula 3>
<Formula 4>
<Formula 5>

In Formulae 1 to 5, $A_1$ and $A_2$ may be each independently selected from a substituted or unsubstituted cyclohexane ring and a substituted or unsubstituted benzene ring; $Z_1$ to $Z_4$ may be each independently selected from the group consisting of a single bond, a substituted or unsubstituted $C_1$-$C_{20}$ alkylene group, a substituted or unsubstituted $C_2$-$C_{20}$ alkenylene group, a substituted or unsubstituted $C_3$-$C_{10}$ cycloalkylene group, a substituted or unsubstituted $C_1$-$C_{10}$ heterocycloalkylene group, a substituted or unsubstituted $C_3$-$C_{10}$ cycloalkenylene group, a substituted or unsubstituted $C_1$-$C_{10}$ heterocycloalkenylene group, a substituted or unsubstituted $C_6$-$C_{60}$ arylene group, a substituted or unsubstituted $C_1$-$C_{60}$ heteroarylene group, *—(C=O)—O—*', and *—C($R_1$)—O—*'.

According to an exemplary embodiment of the present invention, in Formulae 1 to 5, $A_1$ and $A_2$ may be each independently selected from the group consisting of: a benzene and a cyclohexane; and a benzene and a cyclohexane, each substituted with at least one of —F, —CF$_3$, and a $C_1$-$C_5$ alkyl group, $Z_1$ to $Z_4$ may be each independently selected from the group consisting of: a single bond, a $C_1$-$C_{10}$ alkylene group, a $C_3$-$C_{10}$ cycloalkylene group, a $C_1$-$C_{10}$ heterocycloalkylene group, and a $C_1$-$C_{10}$ heteroarylene group; and a $C_1$-$C_{10}$ alkylene group, a $C_3$-$C_{10}$ cycloalkylene group, a $C_1$-$C_{10}$ heterocycloalkylene group, a $C_1$-$C_{10}$ heteroarylene group, *—(C=O)—O—*', and *—C($R_1$)—O—*', each substituted with at least one of —F, —Cl, —Br, —I, a cyano group, an amino group, a $C_1$-$C_5$ alkyl group, and a $C_1$-$C_5$ alkoxy group.

According to an exemplary embodiment of the present invention, in Formulae 1 to 5, $Z_1$ to $Z_4$ may be each independently selected from the group consisting of a single bond, an ethylene group, a propylene group, a butylene group, a pentylene group, a hexylene group, a heptylene group, an octylene group, a nonylene group, a decanylene group, a cyclohexylene group, a phenylene group, a naphthylene group, a tetrahydropyranylene group, a pyridinylene group, a pyrimidinylene group, and a triazinylene group.

According to an exemplary embodiment of the present invention, in Formulae 1 to 5, $L_{11}$, $L_{21}$, $L_{22}$, $L_{31}$, $L_{41}$, and $L_{42}$ may be each independently selected from the group consisting of *—O—*', *—(C=O)—O—*', *—O—(C=O)—*', *—O—(C=O)—O—*', and *—N($R_2$)—*'.

According to an exemplary embodiment of the present invention, in Formulae 1 to 5, $L_{11}$, $L_{21}$, $L_{22}$, $L_{31}$, $L_{41}$, and $L_{42}$ may be each independently selected from the group consisting of *—(C=O)—O—*', *—O—(C=O)—*', and *—N($R_2$)—*'.

According to an exemplary embodiment of the present invention, in Formulae 1 to 5, $R_1$, $R_2$, $R_{11}$ to $R_{16}$, $R_{21}$ to $R_{30}$, $R_{31}$ to $R_{35}$, $R_{41}$ to $R_{48}$, and $R_{51}$ to $R_{53}$ may be each independently selected from the group consisting of a hydrogen atom, —F, —Cl, —Br, —I, a substituted or unsubstituted $C_1$-$C_{20}$ alkyl group, a substituted or unsubstituted $C_1$-$C_{20}$ alkoxy group, a substituted or unsubstituted $C_3$-$C_{10}$ cycloalkyl group, and a substituted or unsubstituted $C_1$-$C_{10}$ heterocycloalkyl group.

According to an exemplary embodiment of the present invention, in Formulae 1 to 5, $R_1$, $R_2$, $R_{11}$ to $R_{16}$, $R_{21}$ to $R_{30}$, $R_{31}$ to $R_{35}$, $R_{41}$ to $R_{48}$, and $R_{51}$ to $R_{53}$ may be each independently selected from the group consisting of: a hydrogen atom, a $C_1$-$C_{10}$ alkyl group, a $C_3$-$C_{10}$ cycloalkyl group, and a $C_1$-$C_{10}$ alkoxy group; and a $C_1$-$C_{10}$ alkyl group, a $C_3$-$C_{10}$ cycloalkyl group, and a $C_1$-$C_{10}$ alkoxy group, each substituted with at least one of —F, —Cl, —Br, —I, a cyano group, a $C_1$-$C_5$ alkyl group, a $C_3$-$C_{10}$ cycloalkyl group, and a $C_1$-$C_5$ alkoxy group.

According to an exemplary embodiment of the present invention, in Formula 5, n1 and n2 may be each independently 0 or 1. For example, n1 may be 1 and n2 may be 0. Alternatively, n1 may be 0 and n2 may be 0. However, embodiments are not limited thereto.

As used in Formulae 1 to 5, at least one substituent of the substituted cyclohexane ring, the substituted benzene ring, the substituted $C_1$-$C_{20}$ alkylene group, the substituted $C_2$-$C_{20}$ alkenylene group, the substituted $C_3$-$C_{10}$ cycloalkylene group, the substituted $C_1$-$C_{10}$ heterocycloalkylene group, the substituted $C_3$-$C_{10}$ cycloalkenylene group, the substituted $C_1$-$C_{10}$ heterocycloalkenylene group, the substituted $C_6$-$C_{60}$ arylene group, the substituted $C_1$-$C_{60}$ heteroarylene group, the substituted $C_1$-$C_{20}$ alkyl group, the substituted $C_1$-$C_{20}$ alkoxy group, the substituted $C_3$-$C_{10}$ cycloalkyl group, and the substituted C1-C10 heterocycloalkyl group may be selected from the group consisting of: —F, —Cl, —Br, —I, an amino group, a cyano group, a $C_1$-$C_5$ alkyl group, and a $C_1$-$C_5$ alkoxy group; and a $C_1$-$C_5$ alkyl group and a $C_1$-$C_5$ alkoxy group, each substituted with at least one of —F, —Cl, —Br, —I, a cyano group, an amino group, a $C_1$-$C_5$ alkyl group, and a $C_1$-$C_5$ alkoxy group.

In Formulae 1 to 5, O. or .O denotes an oxygen radical, and * and *' each denote a binding site to a neighboring atom.

According to an exemplary embodiment of the present invention, the first compound may be represented by Formula 1-1, the second compound may be represented by Formula 2-1 or 2-2, the third compound may be represented by Formula 3-1, the fourth compound may be represented by Formula 4-1, and the fifth compound may be represented by Formula 5-1, but embodiments are not limited thereto:

<Formula 1-1>

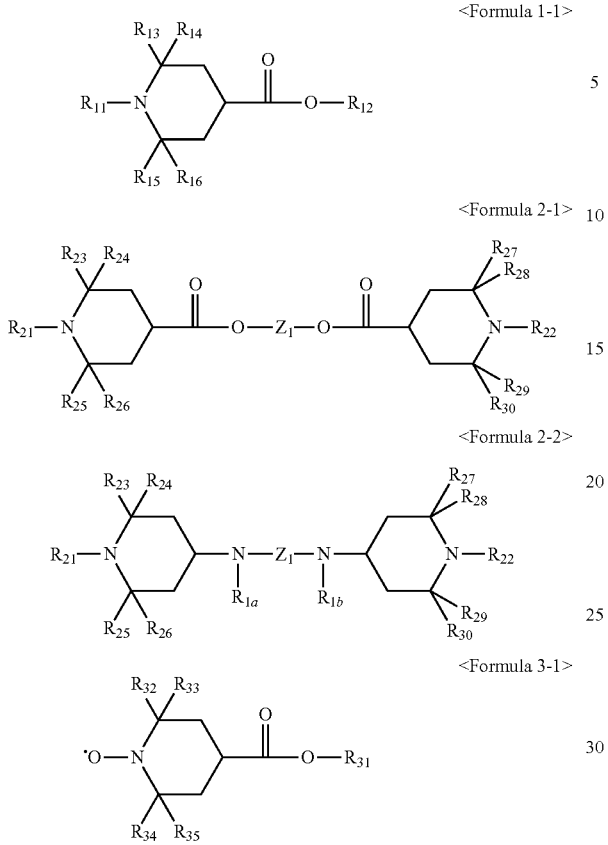

<Formula 4-1>

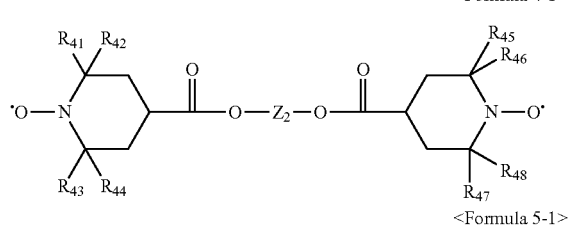

<Formula 5-1>

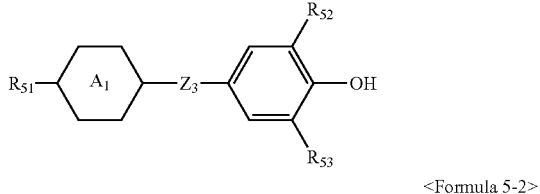

<Formula 5-2>

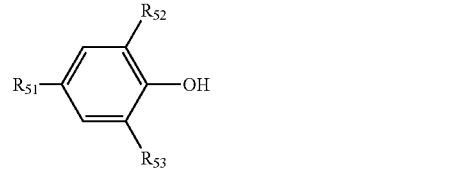

In above Formulae 1-1 to 5-2, $A_1$, $Z_1$ to $Z_3$, O. or .O, $R_{11}$ to $R_{16}$, $R_{21}$ to $R_{30}$, $R_{31}$ to $R_{35}$, $R_{41}$ to $R_{48}$, and $R_{51}$ to $R_{53}$ may be each defined as described above, and $R_{1a}$ and $R_{1b}$ may be each defined as described above with reference to the descriptions of $R_1$.

According to an exemplary embodiment of the present invention, the second compound may be Compound A, the fourth compound may be Compound B, and the fifth compound may be Compound C, but embodiments are not limited thereto:

<Compound A>

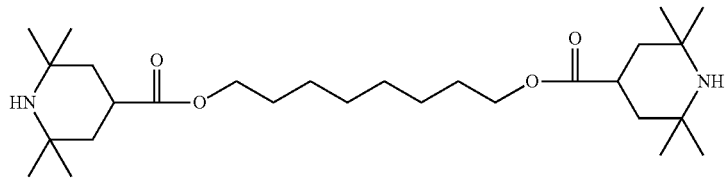

<Compound B>

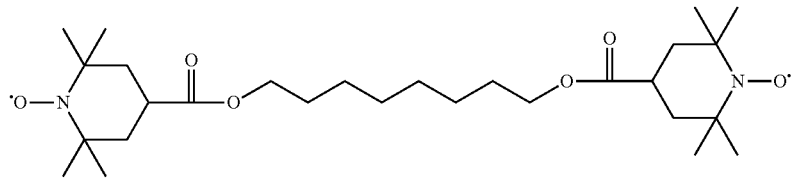

<Compound C>

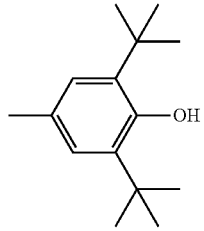

According to an exemplary embodiment of the present invention, the photostable compound-derived functional group may be located at an interface between the first alignment layer AL1 and the liquid crystal layer 300 or at an interface between the second alignment layer AL2 and the liquid crystal layer 300. The photostable compound-derived functional group may suppress formation of a network by inhibiting polymerization of a reactive mesogen monomer, which will be described later, thereby preventing liquid crystal molecules adjacent to the alignment layers from having a pretilt angle.

According to an exemplary embodiment of the present invention, the first side chain and the second side chain may each independently further include at least one of a vertical alignment functional group, an electron transporting moiety, and a photoinitiator-derived functional group. The vertical alignment functional group may be aligned at an angle less than 90° with respect to the surface of the substrate, thereby aligning liquid crystal molecules in contact therewith in the same direction.

The vertical alignment functional group may be located at an interface between the first alignment layer AL1 and the liquid crystal layer 300 or at an interface between the second alignment layer AL2 and the liquid crystal layer 300.

According to an exemplary embodiment of the present invention, the first material may include a first repeating unit represented by Formula 10A, a second repeating unit represented by Formula 10B, and a third repeating unit represented by Formula 10C, and the second material may include a first repeating unit represented by Formula 10A, a second repeating unit represented by Formula 10B, a third repeating unit represented by Formula 10C, and a fourth repeating unit represented by Formula 10D:

<Formula 10A>

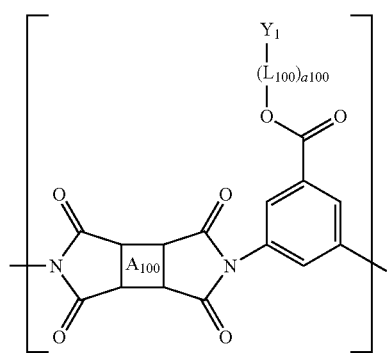

<Formula 10B>

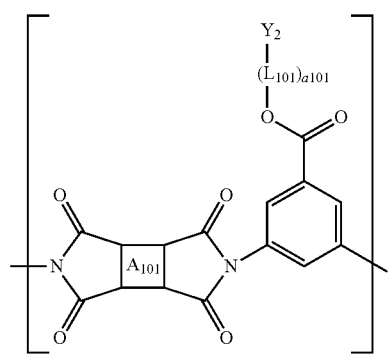

<Formula 10C>

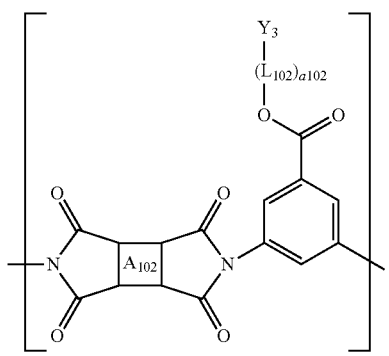

<Formula 10D>

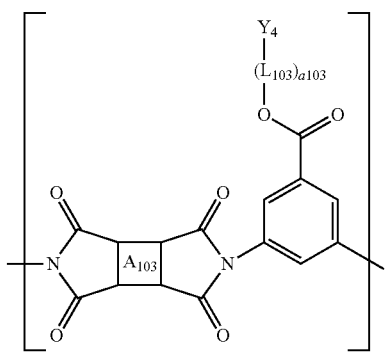

According to an exemplary embodiment of the present invention, in Formulae 10A to 10D, $A_{100}$ to $A_{103}$ may be each independently selected from the group consisting of a substituted or unsubstituted cyclobutane ring, a substituted or unsubstituted cyclohexane ring, and a substituted or unsubstituted benzene ring, $L_{100}$ to $L_{103}$ may be each independently a substituted $C_1$-$C_{20}$ alkylene group, a100 to a103 may be each independently an integer selected from 0 to 3, $Y_1$ may be a vertical alignment functional group, $Y_2$ may be an electron transporting moiety, $Y_3$ may be a photoinitiator-derived functional group, and $Y_4$ may be a photostable compound-derived functional group. Here, the photostable compound-derived functional group may be defined as described above.

According to an exemplary embodiment of the present invention, $Y_1$ may be selected from the group consisting of a substituted or unsubstituted $C_1$-$C_{20}$ alkyl group, a substituted or unsubstituted $C_3$-$C_{10}$ cycloalkyl group, a substituted or unsubstituted $C_1$-$C_{10}$ heterocycloalkyl group, a substituted or unsubstituted $C_3$-$C_{10}$ cycloalkenyl group, a substituted or unsubstituted $C_1$-$C_{10}$ heterocycloakenyl group, a substituted or unsubstituted $C_6$-$C_{60}$ aryl group, a substituted or unsubstituted $C_1$-$C_{60}$ heteroaryl group, and a compound represented by Formula 10-1:

Formula 10-1

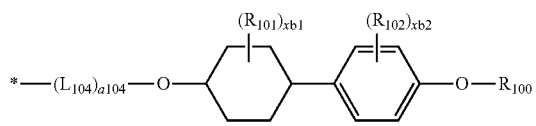

Wherein, in Formula 10-1, $L_{104}$ may be a substituted or unsubstituted $C_1$-$C_{20}$ alkylene group, a104 may be an integer selected from 0 to 3, $R_{100}$ may be selected from the group consisting of a substituted or unsubstituted $C_1$-$C_{20}$ alkyl group and a substituted or unsubstituted $C_3$-$C_{10}$ cycloalkyl group, $R_{101}$ and $R_{102}$ may be each independently selected from the group consisting of: —F, —Cl, —Br, —I, an amino group, a cyano group, a $C_1$-$C_5$ alkyl group, and a $C_1$-$C_5$ alkoxy group; and a $C_1$-$C_5$ alkyl group and a $C_1$-$C_5$ alkoxy group, each substituted with at least one of —F, —Cl, —Br, —I, a cyano group, an amino group, a $C_1$-$C_5$ alkyl group, and a $C_1$-$C_5$ alkoxy group, xb1 and xb2 may be each independently an integer selected from 0 to 4, * may denote a binding site to a neighboring atom, and at least one substituent of the substituted cyclobutane ring, the substituted cyclohexane ring, the substituted benzene ring, the substituted $C_1$-$C_{20}$ alkylene group, the substituted $C_3$-$C_{10}$ cycloalkylene group, the substituted $C_1$-$C_{20}$ alkyl group, the substituted $C_3$-$C_{10}$ cycloalkyl group, the substituted $C_1$-$C_{10}$ heterocycloalkyl group, the substituted $C_3$-$C_{10}$ cycloalkenyl group, the substituted $C_1$-$C_{10}$ heterocycloalkenyl group, the substituted $C_6$-$C_{60}$ aryl group, and the substituted $C_1$-$C_{60}$ heteroaryl group may be selected from the group consisting of: —F, —Cl, —Br, —I, an amino group, a cyano group, a $C_1$-$C_5$ alkyl group, and a $C_1$-$C_5$ alkoxy group; and a $C_1$-$C_5$ alkyl group and a $C_1$-$C_5$ alkoxy group, each substituted with at least one of —F, —Cl, —Br, —I, a cyano group, an amino group, a $C_1$-$C_5$ alkyl group, and a $C_1$-$C_5$ alkoxy group.

According to an exemplary embodiment of the present invention, $Y_2$ may be selected from the group consisting of a substituted or unsubstituted $C_1$-$C_{10}$ heterocycloalkyl group, a substituted or unsubstituted $C_1$-$C_{10}$ heterocycloalkenyl group, a substituted or unsubstituted $C_1$-$C_{60}$ heteroaryl group, and a substituted or unsubstituted monovalent non-aromatic condensed heterocyclic group (except a substituted or unsubstituted carbazolyl group), each of which includes at least one nitrogen atom as a ring-forming atom.

For example, $Y_2$ may be selected from the group consisting of: a pyridinyl group, a pyrazinyl group, a pyrimidinyl group, a pyridazinyl group, a quinolinyl group, an isoquinolinyl group, a benzoquinolinyl group, a phthalazinyl group, a naphthyridinyl group, a quinoxalinyl group, a quinazolinyl group, a cinnolinyl group, a phenanthridinyl group, an acridinyl group, a phenanthrolinyl group, a phenazinyl group, a benzoimidazolyl group, an isobenzothiazolyl group, a benzoxazolyl group, an isobenxoxazolyl group, a triazolyl group, a tetrazolyl group, an oxadiazolyl group, a triazinyl group, a thiadiazolyl group, an imidazopyridinyl group, and an imidazopyrimidinyl group; and a pyridinyl group, a pyrazinyl group, a pyrimidinyl group, a pyridazinyl group, a quinolinyl group, an isoquinolinyl group, a benzoquinolinyl group, a phthalazinyl group, a naphthyridinyl group, a quinoxalinyl group, a quinazolinyl group, a cinnolinyl group, a phenanthridinyl group, an acridinyl group, a phenanthrolinyl group, a phenazinyl group, a benzoimidazolyl group, an isobenzothiazolyl group, a benzoxazolyl group, an isobenxoxazolyl group, a triazolyl group, a tetrazolyl group, an oxadiazolyl group, a triazinyl group, a thiadiazolyl group, an imidazopyridinyl group, and an imidazopyrimidinyl group, each substituted with at least one of a deuterium, —F, —Cl, —Br, —I, a hydroxyl group, a cyano group, a nitro group, an amino group, an amidino group, a hydrazine group, a hydrazone group, a carboxylic acid group or a salt thereof, a sulfonic acid group or a salt thereof, a phosphoric acid group or a salt thereof, a $C_1$-$C_{20}$ alkyl group, a $C_1$-$C_{20}$ alkoxy group, a cyclopentyl group, a cyclohexyl group, a cycloheptyl group, a cyclopentenyl group, a cyclohexenyl group, a phenyl group, a naphthyl group, a fluorenyl group, a spiro-fluorenyl group, a benzofluorenyl group, a dibenzofluorenyl group, a phenalenyl group, an anthracenyl group, a fluoranthenyl group, a triphenylenyl group, a pyrenyl group, a chrysenyl group, a pyridinyl group, a pyrazinyl group, a pyrimidinyl group, a pyridazinyl group, a quinolinyl group, an isoquinolinyl group, a benzoquinolinyl group, a phthalazinyl group, a naphthyridinyl group, a quinoxalinyl group, a quinazolinyl group, a cinnolinyl group, a phenanthridinyl group, an acridinyl group, a phenanthrolinyl group, a phenazinyl group, a benzoimidazolyl group, an isobenzothiazolyl group, a benzoxazolyl group, an isobenzoxazolyl group, a triazolyl group, a tetrazolyl group, an oxadiazolyl group, a triazinyl group, a thiadiazolyl group, an imidazopyridinyl group, an imidazopyrimidinyl group, a biphenyl group, a tert-phenyl group, and —Si($Q_{31}$)($Q_{32}$)($Q_{33}$), wherein $Q_{31}$ to $Q_{33}$ may be each independently selected from the group consisting of a $C_1$-$C_{10}$ alkyl group, a $C_1$-$C_{10}$ alkoxy group, a phenyl group, a naphthyl group, a pyridinyl group, a pyrazinyl group, a pyrimidinyl group, a pyridazinyl group, a quinolinyl group, an isoquinolinyl group, a quinoxalinyl group, a quinazolinyl group, a carbazolyl group, a triazinyl group, a biphenyl group, and a tert-phenyl group.

According to an exemplary embodiment of the present invention, $Y_3$ may be a photoinitiator-derived functional group, and as described below, the photoinitiator-derived functional group absorbs ultraviolet (UV) rays during UV exposure in an electric field, thereby stimulating polymerization of a reactive mesogen monomer.

The photoinitiator-derived functional group may include at least one selected from the group consisting of benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-on, 1-hydroxycyclohexylphenylketone, 2-methyl-1-[4-(methylthio)phenyl]-2-morpholino-propane-1-on, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-(methylthio)-xanthone, 2-(ethylthio)-xantone, 2-(chlorothio)-xantone, 2,4-(dimethylthio)-xantone, 2,4-(diethylthio)-xantone, benzyldimethylketal, acetophenone, dimethylketal, p-dimethylaminobenzoic acid ester, oligo[2-hydroxy-2-methyl-1-[4-(1-methyvinyl)phenyl]propanone], 2,4,6-trimethylbenzoyl-diphenyl-phospine oxide, and a combination thereof, but is not limited thereto.

According to an exemplary embodiment of the present invention, the photoinitiator in the form of a functional group $Y_3$ may be included in the first side chain or in the second side chain of the third repeating unit, so as to be positioned in the first alignment layer AL1 or in the second alignment layer AL2, respectively.

According to another exemplary embodiment of the present invention, the photoinitiator in the form of a separate compound may be positioned in the first alignment layer AL1 or in the second alignment layer AL2.

The first repeating unit may consist of, as shown in Formula 10A', a main chain and a side chain bound to the main chain, wherein $Y_1$ (i.e., a vertical alignment functional group) is bound to the side chain.

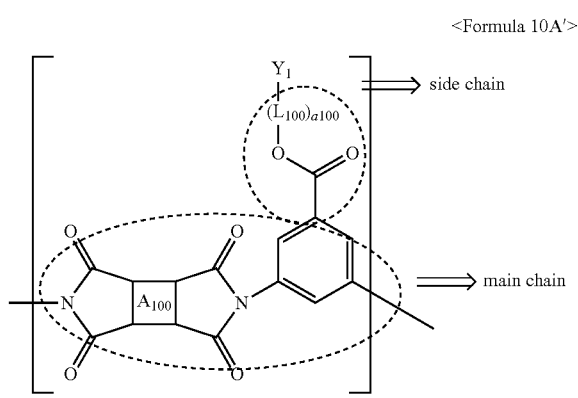

<Formula 10A'>

The second repeating unit, the third repeating unit, and the fourth repeating unit may be defined as described above with reference to the descriptions of the first repeating unit. The first repeating unit, the second repeating unit, the third repeating unit, and the fourth repeating unit may be connected to each other to form a main chain and a plurality of side chains bound to the main chain.

According to an exemplary embodiment of the present invention, the first material may not include the fourth repeating unit, whereas the second material may include the fourth repeating unit. For example, the first material may include the first repeating unit, the second repeating unit, and the third repeating unit, and the second material may include the first repeating unit, the second repeating unit, the third repeating unit, and the fourth repeating unit.

According to another exemplary embodiment of the present invention, the first alignment layer AL1 may include the first material having the first main chain and the first side chain bound to the first main chain, and the second alignment layer AL2 may include the second material having the second main chain and a second side chain bound to the second main chain. The first material may include the first repeating unit, the second repeating unit, and the third repeating unit, and the second material may include the first repeating unit, the second repeating unit, and the fourth repeating unit.

According to an exemplary embodiment of the present invention, the first repeating unit, the second repeating unit, the third repeating unit, and the fourth repeating unit may be each prepared using known methods. For example, the repeating units may be prepared by an imidization reaction associated with a dianhydride-based monomer and a diamine-based monomer. According to another exemplary embodiment of the present invention, a weight ratio of the dianhydride-based monomer and the diamine-based monomer may be about 1:1.

The liquid crystal layer 300 may include a plurality of liquid crystal molecules 310. When an electric field is formed in the liquid crystal layer 300, a major axis of the liquid crystal molecules 310 may be aligned perpendicularly to the electric field. The liquid crystal molecules 310 may be liquid crystal molecules having negative dielectric anisotropy ($\Delta\in$). When an electric field is not formed in the liquid crystal layer 300, the liquid crystal molecules 310 may be aligned almost perpendicularly to the surface of the first substrate 100 or the second substrate 500, and may have a slight pretilt angle determined by the first alignment layer AL1 or the second alignment layer AL2.

According to an exemplary embodiment of the present invention, the liquid crystal molecules 310 may include at least one of alkenyl-based liquid crystal molecules, alkoxy-based liquid crystal molecules, and terphenyl-based liquid crystal molecules.

The alkenyl-based liquid crystal molecules may be represented by one of Formulae 50 and 51, but is not limited thereto:

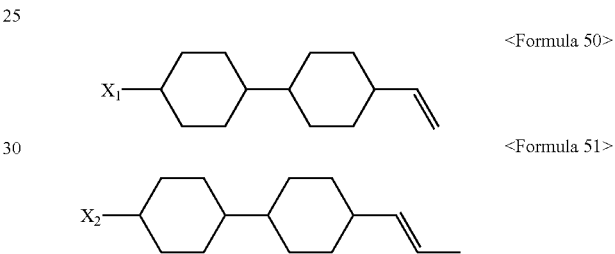

<Formula 50>

<Formula 51>

In Formulae 50 and 51, $X_1$ and $X_2$ may be each independently selected from the group consisting of: a $C_1$-$C_5$ alkyl group; and a $C_1$-$C_5$ alkyl group substituted with at least one of —F, —Cl, —Br, —I, a cyano group, a $C_1$-$C_5$ alkyl group, and a $C_1$-$C_5$ alkoxy group.

According to an exemplary embodiment of the present invention, the liquid crystal layer 300 may further include a reactive mesogen polymer having a repeating unit represented by Formula 60:

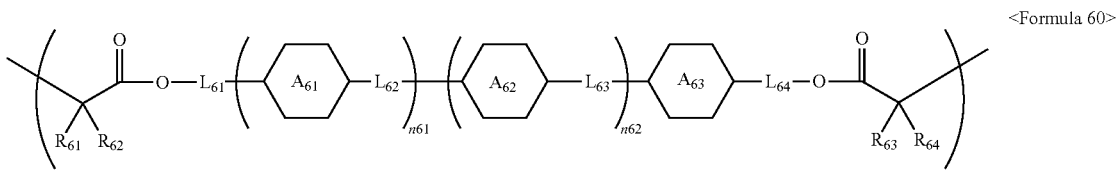

<Formula 60>

In Formula 60, $A_{61}$ ring, $A_{62}$ ring, and $A_{63}$ ring may be each independently selected from the group consisting of a substituted or unsubstituted benzene ring and a substituted or unsubstituted naphthalene ring, $L_{61}$ to $L_{64}$ may be each independently selected from the group consisting of a single bond, *—$CH_2CH_2CH_2$—*', *—$CH_2CH_2O$—*', *—$OCH_2CH_2$—*', *—$CF_2O$—*', *—$OCF_2$—*', *—(C=O)—O—*', and *—O—(C=O)—*', n61 and n62 may be each independently selected from 0 and 1, $R_{61}$ to $R_{64}$ may be each independently selected from the group consisting of a hydrogen atom, —F, —Cl, —Br, —I, a cyano group, a substituted or unsubstituted $C_1$-$C_{10}$ alkyl group, and a substituted or unsubstituted $C_1$-$C_{10}$ alkoxy group, at least one substituent of the substituted benzene ring, the substituted naphthalene ring, the substituted $C_1$-$C_{20}$ alkyl group, and the substituted $C_1$-$C_{20}$ alkoxy group may be selected from the group consisting of —F, —Cl, —B, —I, a cyano group, a $C_1$-$C_5$ alkyl group, and a $C_1$-$C_5$ alkoxy group, and * and *' may each denote a binding site to a neighboring atom.

*—$CH_2CH_2CH_2$—*', *—$CH_2CH_2O$—*', *—$OCH_2CH_2$—*', *—(C=O)—O—*', and *—O—(C=O)—*', $R_{61}$ to $R_{64}$ may be each independently selected from the group consisting of: a hydrogen atom and a $C_1$-$C_{10}$ alkyl group; and a $C_1$-$C_{10}$ alkyl group substituted with at least one of —F, —Cl, —Br, —I, a cyano group, a $C_1$-$C_5$ alkyl group, and a $C_1$-$C_5$ alkoxy group.

According to an exemplary embodiment of the present invention, the reactive mesogen polymer having the repeating unit represented by Formula 60 may be derived from Compounds 60-A to 60-E, but is not limited thereto:

<Compound 60A>

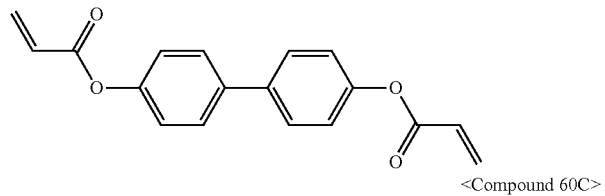

<Compound 60B>

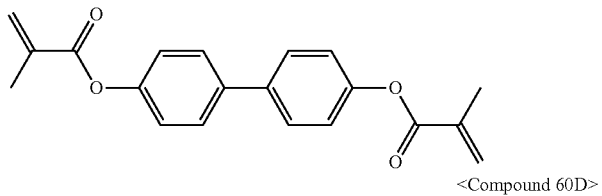

<Compound 60C>

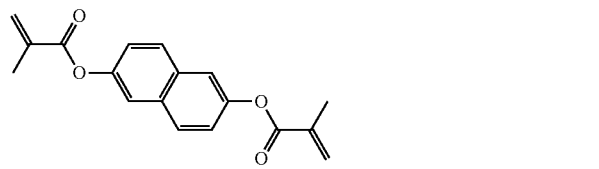

<Compound 60D>

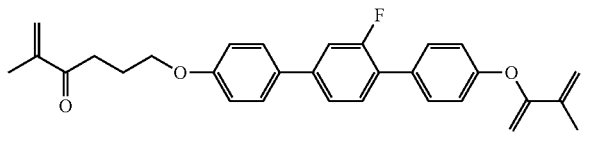

<Compound 60E>

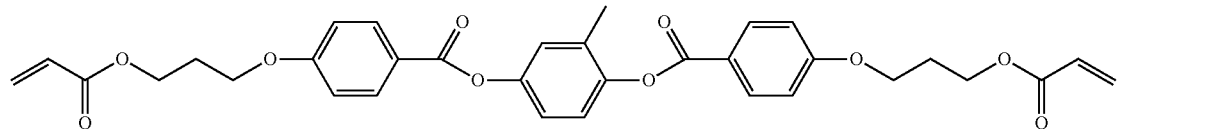

According to an exemplary embodiment of the present invention, $A_{61}$ ring, $A_{62}$ ring, and $A_{63}$ ring may be each independently selected from formulae represented by Formulae 61-1 and 61-2:

Formula 61-1

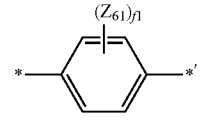

Formula 61-2

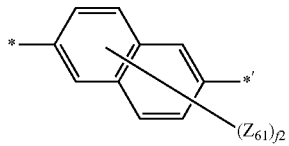

In Formulae 61-1 and 61-2, $Z_{61}$ may be selected from the group consisting of a hydrogen atom, —F, —Cl, —Br, —I, a cyano group, a $C_1$-$C_5$ alkyl group, and a $C_1$-$C_5$ alkoxy group, f1 may be an integer selected from 1 to 3, and f2 may be an integer selected from 1 to 5, and * and *' may each denote a binding site to a neighboring atom.

According to an exemplary embodiment of the present invention, $L_{61}$ to $L_{64}$ may be each independently selected from the group consisting of a single bond, According to an exemplary embodiment of the present invention, the reactive mesogen polymer may be disposed at an interface between the first alignment layer AL1 and the liquid crystal layer 300 or at an interface between the second alignment layer AL2 and the liquid crystal layer 300. The reactive mesogen polymer may form a network to make the liquid crystal molecules 301 having a pretilt angle even when a voltage is not applied to the liquid crystal layer 300.

When an electric field is formed by applying a voltage to a negative liquid crystal layer 300 vertically aligned by the vertical alignment functional group included in the first alignment layer AL1 or the second alignment layer AL2, the liquid crystal molecules 301 may be aligned perpendicularly to the electric field. When the vertically aligned liquid crystal molecules 301 are exposed to UV light, the reactive mesogen polymers contained in the liquid crystal layer 300 may react with each other (radical polymerization) to crosslink with each other to have a pretilt angle.

In this regard, one of the first alignment layer AL1 and the second alignment layer AL2 may include a material including a side chain with the photostable compound-derived functional group, and the other may not include the material including the side chain with the photostable compound-derived functional group. Thus, in the alignment layer including a side chain without including the photostable compound-derived functional group, the reactive mesogen monomer may be polymerized in the presence of the electric field, thereby forming a network, so that the liquid crystal molecules 301 adjacent to the reactive mesogen polymer and the alignment layer may be aligned to have a predetermined pretilt angle relative to the alignment layer. Thus, the network of the reactive mesogen polymer may support the vertical alignment functional group aligned to have the pretilt angle such that the liquid crystal molecules 301 may have the pretilt angle even when the voltage is not applied thereto. On the contrary, in the alignment layer including the side chain including the photostable compound-derived functional group, the photostable compound-derived functional group may react with the reactive mesogen monomer to suppress polymerization of the reactive mesogen monomer, thereby inhibiting formation of the network of the reactive mesogen polymer and preventing the liquid crystal molecules 301 from having the pretilt angle when the voltage is not applied. Thus, the liquid crystal molecules 301 respectively adjacent to the first alignment layer AL1 and the second alignment layer AL2 may be controlled to have different pretilt angles.

According to an exemplary embodiment of the present invention, as illustrated in FIG. 4, the angle θ1 between a major axis of the liquid crystal molecules 301 in contact with the first alignment layer AL1 and a surface of the first substrate 100 may be different from the angle θ2 between a major axis of the liquid crystal molecules 301 in contact with the second alignment layer AL2 and a surface of the second substrate 500.

According to another exemplary embodiment of the present invention, the first substrate 100 may be a lower substrate, the second substrate 500 may be an upper substrate, the second side chain may include the photostable compound-derived functional group, and the first side chain may not include the photostable compound-derived functional group.

According to another exemplary embodiment of the present invention, the first substrate 100 and the second substrate 500 may be bent to have almost the same radius of curvature. Accordingly, the second substrate 500 may be located inside of the radius of curvature, the second side chain may include the photostable compound-derived functional group, and the first side chain may not include the photostable compound-derived functional group.

According to another exemplary embodiment of the present invention, the first substrate 100 and the second substrate 500 may be bent to have almost the same radius of curvature. Accordingly, the second substrate 500 may be located inside of the radius of curvature, the second side chain may include the photostable compound-derived functional group, the first side chain may not include the photostable compound-derived functional group, and the photostable compound-derived functional group contained in the second side chain may be located between the second alignment layer AL2 and the liquid crystal layer 300.

According to an exemplary embodiment of the present invention, since the second alignment layer AL2 disposed between the second substrate 500 located inside of the radius of curvature and the liquid crystal layer 300 includes the second side chain including the photostable compound-derived functional group, and the first alignment layer AL1 disposed between the first substrate 100 located outside of the radius of curvature and the liquid crystal layer 300 may include the first chain not including the photostable compound-derived functional group, an angle θ2 between a major axis of the liquid crystal molecules 301 in contact with the second alignment layer AL2 and a surface of the second substrate 500 may be greater than an angle θ1 between a major axis of the liquid crystal molecules 301 in contact with the first alignment layer AL1 and a surface of the first substrate 100. Accordingly, when the LCD 1000 is applied to a curved panel, generation of texture caused by misalignment during a bending process may be reduced.

According to an exemplary embodiment of the present invention, an angle θ2 between a major axis of the liquid crystal molecules 301 in contact with the second alignment layer AL2 and a surface of the second substrate 500 may be greater than an angle θ1 between a major axis of the liquid crystal molecules 301 in contact with the first alignment layer AL1 and a surface of the first substrate 100 by equal to or greater than 0.8°. According to another exemplary embodiment of the present invention, an angle θ2 between a major axis of the liquid crystal molecules 301 in contact with the second alignment layer AL2 and a surface of the second substrate 500 may be greater than an angle θ1 between a major axis of the liquid crystal molecules 301 in contact with the first alignment layer AL1 and a surface of the first substrate 100 by equal to or greater than 0.2°.

According to an exemplary embodiment of the present invention, the LCD device 1000 may be a vertically aligned mode LCD device.

The present inventors analyzed effects of bending on the LCD device via computer simulation by misaligning the first substrate 100 and the second substrate 500 by 30 μm, and varying a pretilt angle θ1 between a major axis of the liquid crystal molecules 301 in contact with the first alignment layer AL1 and the surface of the first substrate 100 and an angle θ2 between a major axis of the liquid crystal molecules 301 in contact with the second alignment layer AL2 and the surface of the second substrate 500. The results are shown in Table 1 below.

TABLE 1

| Pretilt angle (°) | | | Transmittance (a.u.) | | |
| --- | --- | --- | --- | --- | --- |
| θ1 | θ2 | delta | alignment | 30 μm M/A | Luminance Change |
| 1 | 0 | 1 | 0.17072 | 0.17072 | 0.00% |
| 1 | 0.2 | 0.8 | 0.17191 | 0.16988 | −1.20% |
| 1 | 0.5 | 0.5 | 0.17339 | 0.16651 | −4.00% |
| 1 | 0.8 | 0.2 | 0.17459 | 0.1625 | −6.90% |
| 1 | 1 | 0 | 0.17527 | 0.15955 | −9.00% |

In Table 1, delta represents a difference between pretilt angles, and M/A represents misalignment.

Referring to Table 1, while a luminance decreases by 9% when the difference between the pretilt angles of the first substrate 100 and the second substrate 500 is 0, a luminance decreases by 1.2% or less when the difference between the pretilt angles of the first substrate and the second substrate is 0.8 or greater indicating that a luminance reduction is caused by the misalignment. Thus, since the difference between the pretilt angles of the first substrate 100 and the second substrate 500 is controllable to be 0.8° or greater in the LCD device according to an exemplary embodiment, generation of unstable textures due to the misalignment may be reduced, and thus transmittance may be improved. Therefore, quality image may be improved.

Figure 5:
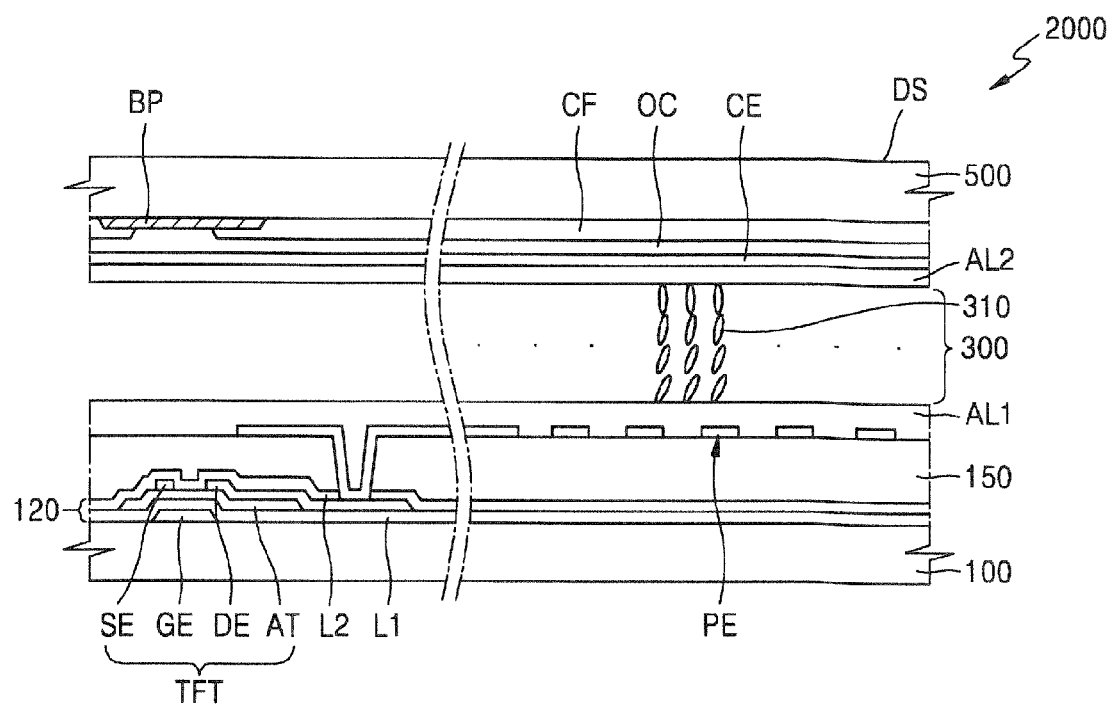
FIG. 5 is a schematic cross-sectional view of a LCD device 2000 according to an exemplary embodiment of the present invention.

FIG. 5 is a schematic cross-sectional view of an LCD device 2000 according to an exemplary embodiment of the present invention. Referring to FIG. 5, the LCD device 2000 may include a first substrate 100, a second substrate 500, and a liquid crystal layer 300. The liquid crystal layer 300 may include a plurality of liquid crystal molecules 310 having negative dielectric anisotropy. The liquid crystal molecules 310 adjacent to the first substrate 100 may have a predetermined pretilt angle of about 0.5° to about 15°, and the liquid crystal molecules 310 adjacent to the second substrate 500 may be aligned almost perpendicularly to the surface of the second substrate 500 without having a pretilt angle. For the formation of the pretilt angle, the first alignment layer AL1 may be formed on the first substrate 100, and the second alignment layer AL2 may be formed on the second substrate 500 as illustrated in FIG. 3.

A thin film transistor (TFT) array layer 120 and a pixel electrode PE may be formed on the first substrate 100. The TFT array layer 120 may include a plurality of switching devices TFT and a plurality of gate lines and a plurality of data lines that are not shown.

The switching device TFT may be a thin film transistor and may include an active layer AT, a gate electrode GE, a source electrode SE, and a drain electrode DE.

In FIG. 5, a first insulating layer L1, which is a gate insulating layer, may be formed on the gate electrode GE, and the active layer AT may be formed on the first insulating layer L1. The source electrode SE and the drain electrode DE may be formed on the active layer AT to be spaced apart from each other, and a second insulating layer L2 may be formed to cover the source electrode SE and the drain electrode DE.

The active layer AT may include various materials. For example, the active layer AT may include an inorganic semiconductor material such as amorphous silicon or crystalline silicon. As another exemplary embodiment of the present invention, the active layer AT may include a semiconductor oxide. As yet another exemplary embodiment of the present invention, the active layer AT may include an organic semiconductor material.

The gate electrode GE, the source electrode SE, and the drain electrode DE may be formed of at least one metal selected from the group consisting of aluminum (Al), platinum (Pt), palladium (Pd), silver (Ag), magnesium (Mg), gold (Au), nickel (Ni), neodymium (Nd), iridium (Ir), chromium (Cr), nickel (Li), calcium (Ca), molybdenum (Mo), titanium (Ti), tungsten (W), and copper (Cu) in a single layer or multiple layers.

The first insulating layer L1 and the second insulating layer L2 may be formed of various type of insulating materials. The first insulating layer L1 and the second insulating layer L2 may be an insulating layer including at least one selected from the group consisting of $SiO_2$, $SiN_x$, SiON, $Al_2O_3$, $TiO_2$, $Ta_2O_5$, $HfO_2$, $ZrO_2$, BST, and PZT as a single layer or multiple layers.

A planarization layer 150 may further be formed on the TFT array layer 120.

The pixel electrode PE may be provided on the planarization layer 150 and may be connected to the drain electrode DE of the switching element TFT through the planarization layer 150 and the second insulating layer L2.

The first alignment layer AL1 may be formed on the pixel electrode PE, and a light blocking pattern BP, a color filter CF, an over coating layer OC, and a common electrode CE may be formed on the second substrate 500. The second alignment layer AL2 may be formed on the common electrode CE. The second substrate 500 may be a glass substrate or a transparent plastic substrate, and the outer surface of the second substrate 500 may be a display surface DS.

The light blocking pattern BP may be disposed on the second substrate 500 at a position corresponding to a region where the switching device TFT, the gate lines (not shown), and the data lines (not shown) are formed and blocks light. The position of the light blocking pattern BP may be exemplarily shown, and the light blocking pattern BP may also be located on the first substrate 100.

The color filter CF may be disposed on the second substrate 500 and may filter colored light. The position of the color filter CF may be exemplarily shown, and the color filter CF may also be located on the first substrate 100. According to an exemplary embodiment of the present invention, the color filter CF and the TFT array layer 120 may be formed on the first substrate 100.

The over coating layer OC may be disposed on the second substrate 500 on which the color filter CF is formed to planarize the upper surface of the second substrate 500. The over coating layer OC may not be used.

The common electrode CE may be disposed on the second substrate 500 so as to face the pixel electrode PE, and a reference voltage defining polarity of voltage applied to the pixel electrode PE, i.e., common voltage, may be applied thereto.

Figure 6:
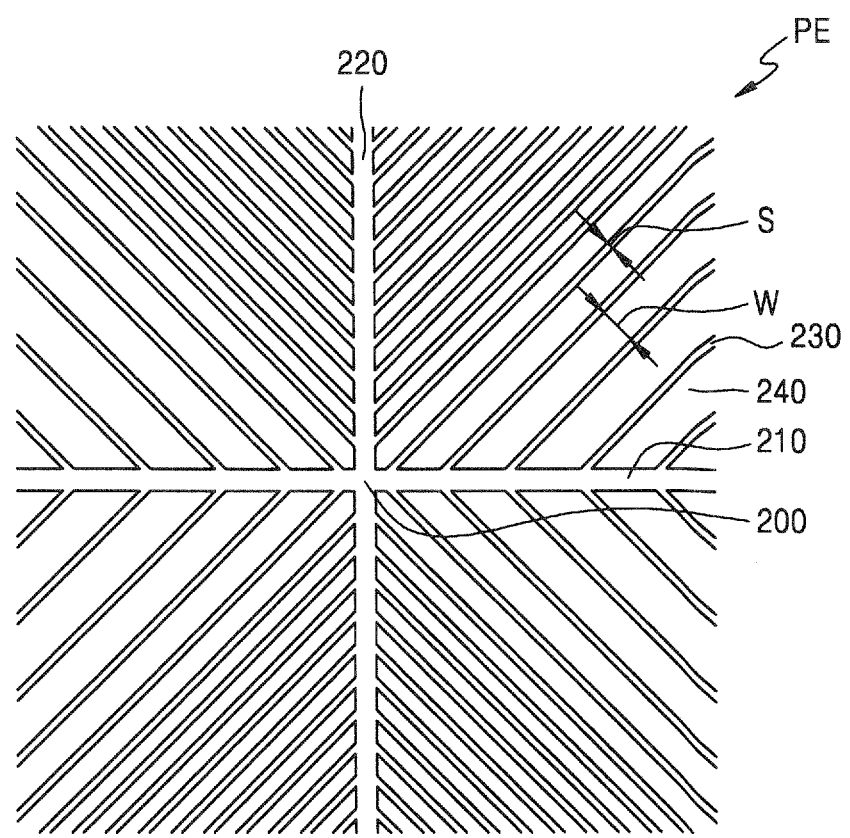
FIG. 6 is a plan view of a pixel electrode employed in the LCD device 2000 of FIG. 5.

The pixel electrode PE may have a shape as illustrated in FIG. 6.

Referring to FIG. 6, the pixel electrode PE may have a cross-shaped stem portion 200, and the cross-shaped stem portion 200 may have a horizontal stem portion 210 and a vertical stem portion 220. A plurality of fine branched electrodes 230 may diagonally extend from the horizontal stem portion 210 and the vertical stem portion 220. A pixel region may be divided into four domains by the cross-shaped stem portion 200.

Although the fine branched electrodes 230 have a linear shape, the shape of the fine branched electrodes 230 may be a zigzag shape. Although a width S of the fine branched electrodes 230 and a width W of fine slits 240 between the fine branched electrodes 230 may be constantly maintained in FIG. 6, they may be varied and appropriately designed according to liquid crystal controlling ability and reduction in texture.

Figure 7:
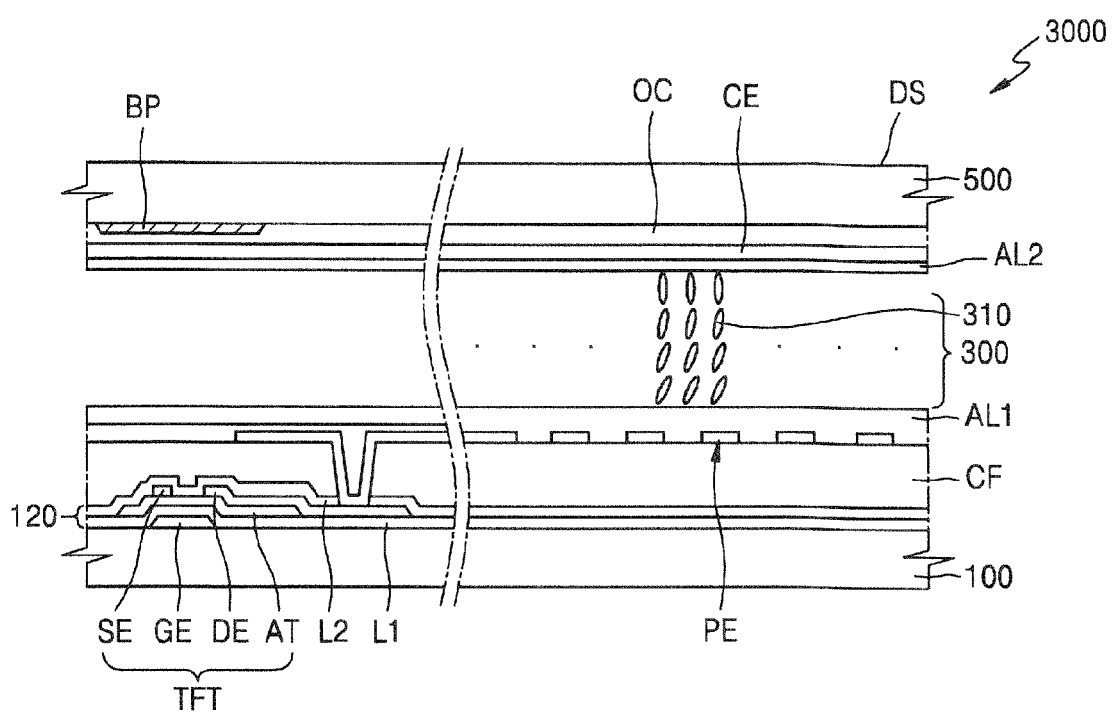
FIG. 7 is a schematic cross-sectional view of an LCD device 3000 according to another exemplary embodiment of the present invention.

FIG. 7 is a schematic cross-sectional view of an LCD device 3000 according to another exemplary embodiment of the present invention.

The LCD device 3000 of FIG. 7 may be different from the LCD device 2000 of FIG. 5, in that the color filter CF is located at different positions.

Referring to FIG. 7, the color filter CF may be formed on the first substrate 100. This structure may be designed by taking into account that a substrate of the display surface DS side, i.e., the second substrate 500, is distorted more seriously by the bending process when applied to a curved panel than the first substrate 100. Errors caused by the bending process may be reduced by disposing the color filter CF on the first substrate 100, which is relatively less distorted. According to an exemplary embodiment of the present invention, both the color filter CF and the TFT array layer 120 may be formed on the first substrate 100.

A method of manufacturing an LCD device according to another exemplary embodiment of the present invention comprises: (a) providing a first alignment layer-forming composition on a first substrate; (b) providing a second alignment layer-forming composition on a second substrate; (c) bonding the first substrate and the second substrate such that the first alignment layer-forming composition and the second alignment layer-forming composition are disposed therebetween; (d) providing a liquid crystal composition between the first alignment layer-forming composition and the second alignment layer-forming composition; and (e) aligning a liquid crystal of the liquid crystal composition.

According to an exemplary embodiment of the present invention, components for driving the LCD device may further be formed on the first substrate and the second substrate and descriptions thereof are given above. For example, both the TFT array layer and the color filter may be formed on the first substrate.

According to an exemplary embodiment of the present invention, one of the first alignment layer-forming composition and the second alignment layer-forming composition may include a photostable compound, and the other may not include the photostable compound. According to another exemplary embodiment of the present invention, the first alignment layer-forming composition may not include the photostable compound, and the second alignment layer-forming composition may include the photo stable compound.

The liquid crystal composition may include alkenyl-based liquid crystal molecules or alkoxy-based liquid crystal molecules. An amount of the alkenyl-based liquid crystal molecules or the alkoxy-based liquid crystal molecules may be in a range of about 1 part by weight to about 70 parts by weight based on a total weight of 100 parts by weight of the liquid crystal composition. The liquid crystal composition may include a reactive mesogen monomer. An amount of the reactive mesogen monomer may be in a range of about 0.001 part by weight to about 5 parts by weight based on a total weight of 100 parts by weight of the liquid crystal composition.

The providing of the first alignment layer-forming composition on the first substrate may include: preparing the first substrate; applying the first alignment layer-forming composition on the first substrate; performing a first heating of the first substrate; and performing a second heating of the first substrate. In the same manner, the providing of the second alignment layer-forming composition on the second substrate may include: preparing the second substrate; applying the second alignment layer-forming composition on the second substrate; performing a first heating of the second substrate and performing a second heating of the second substrate.

The preparing of the first substrate may include forming a regular fine pattern by using a fine mask or photo resistor. The pattern may have a linear slit structure.

The applying the first alignment layer-forming composition on the first substrate and the applying the second alignment layer-forming composition on the second substrate may be performed using known methods. For example, the first alignment layer-forming composition or the second alignment layer-forming composition may be applied on the first substrate or the second substrate, respectively, by inkjet printing, roll printing, or spin coating.

The performing first and second heating of the first substrate or the second substrate may be performed in a baking cell. After the second heating, the alignment layers may be washed by deionized water or isopropyl alcohol (IPA).

The bonding of the first substrate and the second substrate such that the first alignment layer-forming composition and the second alignment layer-forming composition are disposed therebetween; and the providing the liquid crystal composition between the first alignment layer-forming composition and the second alignment layer-forming composition may be performed using known methods. For example, the liquid crystal composition may be disposed between the first substrate and the second substrate such that surfaces on which the first alignment layer and the second alignment layer are disposed as inner surfaces, and the structure may be sealed.

The aligning of the liquid crystal of the liquid crystal composition may include annealing the bonded first substrate and the second substrate; and exposing the bonded first substrate and second substrate to UV light.

After the bonding, the first substrate and the second substrate may be annealed in a chamber.

The exposing of the bonded first substrate and second substrate to UV light may include UV exposure in a non-electric field or in an electric field. The UV exposure in an electric field may include a process of exposing the bonded first substrate and second substrate to UV light while a voltage is applied to the liquid crystal layer. The UV exposure in an electric field may be performed by irradiating UV light having a luminance of about 2 to about 20 J while applying a voltage of about 4 V to about 20 V.

The aligning of the liquid crystal of the liquid crystal composition may further include exposing the bonded first substrate and second substrate to fluorescent UV light, thereby manufacturing an LCD device having high image quality.

The exposing of the bonded first substrate and second substrate to fluorescent UV light may be performed to remove the reactive mesogen monomer which is not polymerized and remains in the liquid crystal layer. When the non-polymerized reactive mesogen monomer remains in the liquid crystal layer, light leakage phenomenon or after-image occurs, thereby reducing image quality of the LCD device. The exposing of the bonded first substrate and second substrate to fluorescent UV light may be performed by irradiating fluorescent UV light having a wavelength of about 300 nm to about 390 nm for about 150 minutes to about 200 minutes while a voltage is not applied thereto.

The method may further include bending the first substrate and the second substrate to form a curved display surface. For example, the first substrate and the second substrate may be bent such that the second substrate is located inside of the radius of curvature.

The LCD device may have the radius of curvature in a range of about 1,000 mm to about 4,000 mm, and for example, may have the radius of curvature of 4,000 mm.

In regard to the LCD device prepared according to the method described above, the present inventors measured changes in a pretilt angle between a major axis of the liquid crystal molecules in contact with the second alignment layer AL2 and the surface of the second surface, according to types of the photostable compounds (e.g., Compounds A, B, and C) and amounts of the photostable compounds. Here, the UV exposure in an electric field is performed by irradiating UV light having a luminance of about 4 J while applying a voltage of about 8.5 V. The exposing to fluorescent UV light is performed by irradiating fluorescent UV light for about 180 minutes. The results are shown in Table 2 below.

TABLE 2

| Amount (ppm) | Pretilt angle ($\theta 2$) | | |
| --- | --- | --- | --- |
| | Compound A | Compound B | Compound C |
| 0 | 86.9 | 86.9 | 86.9 |
| 100 | 87.5 | 88.0 | 87.7 |
| 300 | 88.0 | 88.2 | 88.2 |
| 500 | 88.6 | 88.4 | 88.4 |
| 1000 | 89.1 | 88.7 | 88.6 |

Referring to Table 2, as the amounts of Compounds A, B, and C increase, the pretilt angle $\theta 2$ between a major axis of the liquid crystal molecules in contact with the second alignment layer and the surface of the second surface decreases. Therefore, it is confirmed that the LCD device according to the exemplary embodiments is capable of making a pretilt angle θ2 between a major axis of the liquid crystal molecules in contact with the second alignment layer and the surface of the second surface small, thereby controlling the first substrate and the second substrate to have different pretilt angles from each other. In this regard, the miss-aligned texture may be reduced when the LCD device is applied to a curved panel.

As described above, according to the one or more of the above exemplary embodiments of the present invention, an LCD device capable of displaying a high quality image by having reduced miss-aligned texture and improved transmittance may be provided.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A liquid crystal display (LCD) device comprising:
a first substrate;
a second substrate facing the first substrate;
a liquid crystal layer disposed between the first substrate and the second substrate and comprising liquid crystal molecules and a reactive mesogen monomer;
a first alignment layer disposed between the first substrate and the liquid crystal layer;
a second alignment layer disposed between the second substrate and the liquid crystal layer, wherein
one of the first alignment layer and the second alignment layer comprises a photostable compound, or a photostable compound-derived functional group, or a photostable compound and a photostable compound-derived functional group, and the other one of the first alignment layer and the second alignment layer does not comprise even one of the photostable compound and the photostable compound-derived functional group; and
a network of reactive mesogen polymer formed from the reactive mesogen monomer, disposed at an interface between the liquid crystal layer and the one of the first alignment layer and the second alignment layer which does not comprise even one of the photostable compound and the photostable compound-derived functional group, wherein
both of the photostable compound and the photostable compound-derived functional group inhibit polymerization of the reactive mesogen monomer; and
both of the first alignment layer and the second alignment layer comprise at least one selected from the group consisting of a photoinitiator and a photoinitiator-derived functional group, wherein
both of the photoinitiator and the photoinitiator-derived functional group absorb ultraviolet (UV) rays and stimulate polymerization of the reactive mesogen monomer.

2. The liquid crystal display device of claim 1, wherein the first alignment layer comprises a first material having a first main chain and a first side chain bound to the first main chain, and the second alignment layer comprises a second material having a second main chain and a second side chain bound to the second main chain, wherein
one of the first side chain and the second side chain comprises the photostable compound-derived functional group, and the other does not comprise the photostable compound-derived functional group.

3. The liquid crystal display device of claim 1, wherein the first substrate and the second substrate are bent to have almost same radius of curvature, and the second substrate is located inside of the radius of the curvature.

4. The liquid crystal display device of claim 2, wherein the first substrate and the second substrate are bent to have almost same radius of curvature, and the second substrate is located inside of the radius of the curvature, the second side chain comprises the photostable compound-derived functional group, and the first side chain does not comprise the photostable compound-derived functional group.

5. The liquid crystal display device of claim 2, wherein the first substrate and the second substrate are bent to have almost same radius of curvature, the second substrate is located inside of the radius of the curvature, the second side chain comprises the photostable compound-derived functional group, and the first side chain does not comprise the photostable compound-derived functional group, wherein the photostable compound-derived functional group comprised in the second side chain is disposed between the second alignment layer and the liquid crystal layer.

6. The liquid crystal display device of claim 1, wherein an angle between a major axis of the liquid crystal molecules in contact with the first alignment layer and a surface of the first substrate is different from an angle between a major axis of the liquid crystal molecules in contact with the second alignment layer and a surface of the second substrate.

7. The liquid crystal display device of claim 1, wherein an angle between a major axis of the liquid crystal molecules in contact with the second alignment layer and a surface of the second substrate is greater than an angle between a major axis of the liquid crystal molecules in contact with the first alignment layer and a surface of the first substrate.

8. The liquid crystal display device of claim 1, wherein the photostable compound-derived functional group is located at an interface between the first alignment layer and the liquid crystal layer or at an interface between the second alignment layer and the liquid crystal layer.

9. The liquid crystal display device of claim 1, wherein the photostable compound comprises at least one compound selected from the group consisting of a first compound represented by Formula 1, a second compound represented by Formula 2, a third compound represented by Formula 3, a fourth compound represented by Formula 4, and a fifth compound represented by Formula 5:

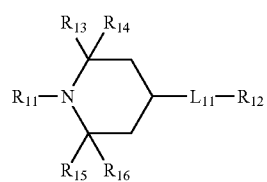
<Formula 1>

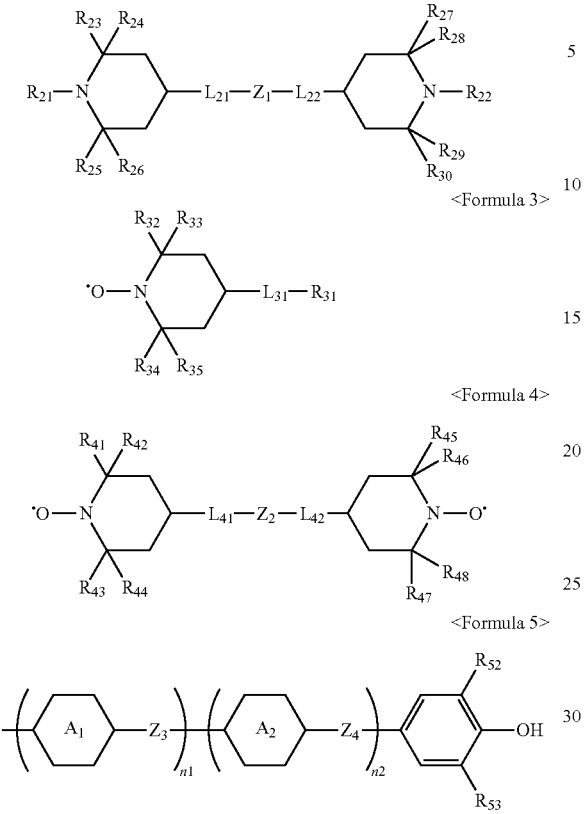

<Formula 2>
<Formula 3>
<Formula 4>
<Formula 5>

Wherein in Formulae 1 to 5, $A_1$ and $A_2$ are each independently selected from a substituted or unsubstituted cyclohexane ring and a substituted or unsubstituted benzene ring, $Z_1$ to $Z_4$ are each independently selected from the group consisting of a single bond, a substituted or unsubstituted $C_1$-$C_{20}$ alkylene group, a substituted or unsubstituted $C_2$-$C_{20}$ alkenylene group, a substituted or unsubstituted $C_3$-$C_{10}$ cycloalkylene group, a substituted or unsubstituted $C_1$-$C_{10}$ heterocycloalkylene group, a substituted or unsubstituted $C_3$-$C_{10}$ cycloalkenylene group, a substituted or unsubstituted $C_1$-$C_{10}$ heterocycloalkenylene group, a substituted or unsubstituted $C_6$-$C_{60}$ arylene group, a substituted or unsubstituted $C_1$-$C_{60}$ heteroarylene group, *—(C=O)—O—*', and *—C(R_1)—O—*', $L_{11}$, $L_{21}$, $L_{22}$, $L_{31}$, $L_{41}$, and $L_{42}$ are each independently selected from the group consisting of *—O—*', *—(C=O)—O—*', *—O—(C=O)—*', *—O—(C=O)—O—*', and *—N(R_2)—*', $R_1$, $R_2$, $R_{11}$ to $R_{16}$, $R_{21}$ to $R_{30}$, $R_{31}$ to $R_{35}$, $R_{41}$ to $R_{48}$, and $R_{51}$ to $R_{53}$ are each independently selected from the group consisting of a hydrogen, —F, —Cl, —Br, —I, a substituted or unsubstituted $C_1$-$C_{20}$ alkyl group, a substituted or unsubstituted $C_1$-$C_{20}$ alkoxy group, a substituted or unsubstituted $C_3$-$C_{10}$ cycloalkyl group, and a substituted or unsubstituted $C_1$-$C_{10}$ heterocycloalkyl group, n1 and n2 are each independently 0 or 1, at least one substituent of the substituted cyclohexane ring, the substituted benzene ring, the substituted $C_1$-$C_{20}$ alkylene group, the substituted $C_2$-$C_{20}$ alkenylene group, the substituted $C_3$-$C_{10}$ cycloalkylene group, the substituted $C_1$-$C_{10}$ heterocycloalkylene group, the substituted $C_3$-$C_{10}$ cycloalkenylene group, the substituted $C_1$-$C_{10}$ heterocycloalkenylene group, the substituted $C_6$-$C_{60}$ arylene group, the substituted $C_1$-$C_{60}$ heteroarylene group, the substituted $C_1$-$C_{20}$ alkyl group, the substituted $C_1$-$C_{20}$ alkoxy group, the substituted $C_3$-$C_{10}$ cycloalkyl group, and the substituted $C_1$-$C_{10}$ heterocycloalkyl group is selected from the group consisting of:

—F, —Cl, —Br, —I, an amino group, a cyano group, a $C_1$-$C_5$ alkyl group, and a $C_1$-$C_5$ alkoxy group; and a $C_1$-$C_5$ alkyl group and a $C_1$-$C_5$ alkoxy group, each substituted with at least one of —F, —Cl, —Br, —I, a cyano group, an amino group, a $C_1$-$C_5$ alkyl group, and a $C_1$-$C_5$ alkoxy group, O. or .O is an oxygen radical, and

* and *' each denote a binding site to a neighboring atom.

10. The liquid crystal display device of claim 9, wherein in Formulae 1 to 5, $A_1$ and $A_2$ are each independently selected from the group consisting of:

a benzene and a cyclohexane; and a benzene and a cyclohexane, each substituted with at least one of —F, —CF_3, and a $C_1$-$C_5$ alkyl group, $Z_1$ to $Z_4$ are each independently selected from the group consisting of:

a single bond, a $C_1$-$C_{10}$ alkylene group, a $C_3$-$C_{10}$ cycloalkylene group, a $C_1$-$C_{10}$ heterocycloalkylene group, and a $C_1$-$C_{10}$ heteroarylene group; and a $C_1$-$C_{10}$ alkylene group, a $C_3$-$C_{10}$ cycloalkylene group, a $C_1$-$C_{10}$ heterocycloalkylene group, a $C_1$-$C_{10}$ heteroarylene group, *—(C=O)—O—*', and *—C(R_1)—O—*', each substituted with at least one of —F, —Cl, —Br, —I, a cyano group, an amino group, a $C_1$-$C_5$ alkyl group, and a $C_1$-$C_5$ alkoxy group, $L_{11}$, $L_{21}$, $L_{22}$, $L_{31}$, $L_{41}$, and $L_{42}$ are each independently selected from the group consisting of *—(C=O)—O—*', *—O—(C=O)—*', and *—N(R_2)—*', and $R_1$, $R_2$, $R_{11}$ to $R_{16}$, $R_{21}$ to $R_{30}$, $R_{31}$ to $R_{35}$, $R_{41}$ to $R_{48}$, and $R_{51}$ to $R_{53}$ are each independently selected from the group consisting of:

a hydrogen, a $C_1$-$C_{10}$ alkyl group, a $C_3$-$C_{10}$ cycloalkyl group, and a $C_1$-$C_{10}$ alkoxy group; and a $C_1$-$C_{10}$ alkyl group, a $C_3$-$C_{10}$ cycloalkyl group, and a $C_1$-$C_{10}$ alkoxy group, each substituted with at least one of —F, —Cl, —Br, —I, a cyano group, a $C_1$-$C_5$ alkyl group, a $C_3$-$C_{10}$ cycloalkyl group, and a $C_1$-$C_5$ alkoxy group.

11. The liquid crystal display device of claim 9, wherein the first compound is represented by Formula 1-1, the second compound is represented by one of Formulae 2-1 and 2-2, the third compound is represented by Formula 3-1, the fourth compound is represented by Formula 4-1, and the fifth compound is represented by one of Formulae 5-1 and 5-2:

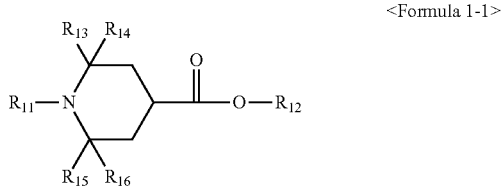

<Formula 1-1>

<Formula 2-1>
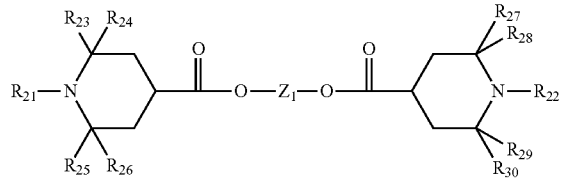

<Formula 5-1>
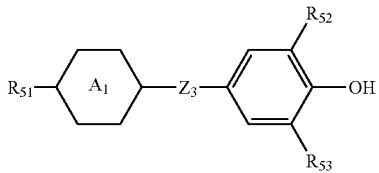

<Formula 2-2>
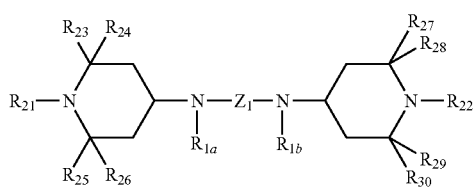

<Formula 5-2>

<Formula 3-1>
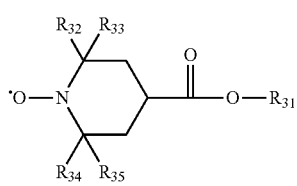

Wherein in the Formulae above, descriptions of $A_1$, $Z_1$ to $Z_3$, O. and .O, $R_{11}$ to $R_{16}$, $R_{21}$ to $R_{30}$, $R_{31}$ to $R_{35}$, $R_{41}$ to $R_{48}$, and $R_{51}$ to $R_{53}$ are as those in claim 9, and descriptions of $R_{1a}$ and $R_{1b}$ are as those in connection with $R_1$ in claim 9.

12. The liquid crystal display device of claim 2, wherein the first main chain and the second main chain are each independently at least one selected from the group consisting of polysiloxane, polyamic acid, polyimide, nylon, polyvinyl alcohol, and polyvinyl chloride.

13. The liquid crystal display device of claim 2, wherein the first side chain and the second side chain each independently comprise at least one selected from the group consisting of a vertically aligned functional group, an electron transporting moiety.

14. The liquid crystal display device of claim 13, wherein the vertically aligned functional group is present at an interface between the first alignment layer and the liquid crystal layer and between the second alignment layer and the liquid crystal layer.

<Formula 4-1>
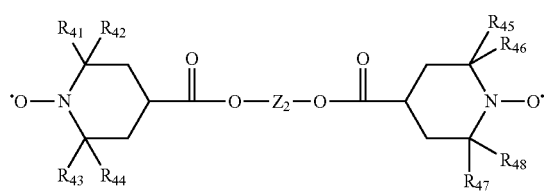

15. The liquid crystal display device of claim 1, wherein the liquid crystal molecule has a negative (−) dielectric anisotropy (Δε).

16. The liquid crystal display device of claim 1, wherein the liquid crystal molecule comprises at least one selected from the group consisting of an alkenyl-based liquid crystal molecule, an alkoxy-based liquid crystal molecule, and a terphenyl-based liquid crystal molecule.

17. The liquid crystal display device of claim 1, wherein the liquid crystal layer further comprises a reactive mesogen polymer comprising a repeating unit represented by Formula 60:

<Formula 60>
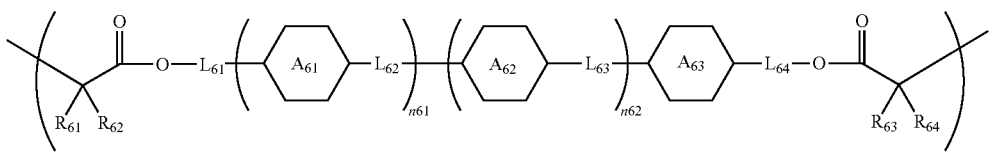

Wherein in Formula 60, a ring $A_{61}$, a ring $A_{62}$, and a ring $A_{63}$ are each independently selected from the group consisting of a substituted or unsubstituted benzene ring and a substituted or unsubstituted naphthalene ring, $L_{61}$ to $L_{64}$ are each independently selected from the group consisting of a single bond, *—CH$_2$CH$_2$CH$_2$—*', *—CH$_2$CH$_2$O—*', *—OCH$_2$CH$_2$—*', *—CF$_2$O—*', *—OCF$_2$—*', *—(C=O)—O—*', and *—O—(C=O)—*', n61 and n62 are each independently 0 or 1, $R_{61}$ to $R_{64}$ are each independently selected from the group consisting of a hydrogen, —F, —Cl, —Br, —I, a cyano group, a substituted or unsubstituted $C_1$-$C_{10}$ alkyl group, and a substituted or unsubstituted $C_1$-$C_{10}$ alkoxy group, at least one substituent of the substituted benzene ring, the substituted naphthalene ring, the substituted $C_1$-$C_{20}$ alkyl group, and the substituted $C_1$-$C_{20}$ alkoxy group is selected from the group consisting of —F, —Cl, —Br, —I, a cyano group, a $C_1$-$C_5$ alkyl group, and a $C_1$-$C_5$ alkoxy group, and

* and *' are each a binding site to a neighboring atom.

18. The liquid crystal display device of claim 17, wherein the ring $A_{61}$, the ring $A_{62}$, and the ring $A_{63}$ are each independently selected from formulae represented by Formulae 61-1 and 61-2:

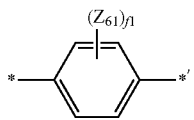

Formula 61-1

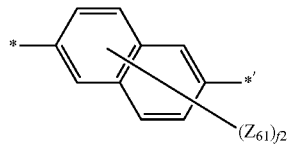

Formula 61-2

Wherein in Formulae 61-1 and 61-2, $Z_{61}$ is selected from the group consisting of a hydrogen, —F, —Cl, —Br, —I, a cyano group, a $C_1$-$C_5$ alkyl group, and a $C_1$-$C_5$ alkoxy group, f1 is an integer selected from 1 to 3, f2 is an integer selected from 1 to 5, and

* and *' are each a binding site to a neighboring atom.

19. The liquid crystal display device of claim 17, wherein in Formula 60, $L_{61}$ to $L_{64}$ are each independently selected from the group consisting of a single bond, *—CH$_2$CH$_2$CH$_2$—*', *—CH$_2$CH$_2$O—*', *—OCH$_2$CH$_2$—*', *—(C=O)—O—*', and *—O—(C=O)—*', and $R_{61}$ to $R_{64}$ are each independently selected from:

a hydrogen and a $C_1$-$C_{10}$ alkyl group; and a $C_1$-$C_{10}$ alkyl group substituted with at least one of —F, —Cl, —Br, —I, a cyano group, a $C_1$-$C_5$ alkyl group, and a $C_1$-$C_5$ alkoxy group.

20. The liquid crystal display device of claim 1, wherein the liquid crystal display device is a vertically aligned mode liquid crystal display device.

* * * * *